(12) United States Patent
Venalainen

(10) Patent No.: US 10,649,060 B2
(45) Date of Patent: May 12, 2020

(54) SOUND SOURCE LOCALIZATION CONFIDENCE ESTIMATION USING MACHINE LEARNING

(71) Applicant: Microsoft Technology Licensing, LLC, Redmond, WA (US)

(72) Inventor: Kevin Juho Venalainen, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 121 days.

(21) Appl. No.: 15/657,475

(22) Filed: Jul. 24, 2017

(65) Prior Publication Data

US 2019/0025400 A1    Jan. 24, 2019

(51) Int. Cl.
| | | |
|---|---|---|
| *G01S 3/808* | (2006.01) |
| *G06N 3/08* | (2006.01) |
| *H04R 3/00* | (2006.01) |
| *G06N 20/00* | (2019.01) |

(52) U.S. Cl.
CPC .............. *G01S 3/8083* (2013.01); *G06N 3/08* (2013.01); *G06N 20/00* (2019.01); *H04R 3/005* (2013.01); *H04R 2430/20* (2013.01)

(58) Field of Classification Search
None
See application file for complete search history.

(56) References Cited

U.S. PATENT DOCUMENTS

| | | |
|---|---|---|
| 9,432,768 B1 | 8/2016 | O'Neill et al. |
| 2009/0018828 A1 | 1/2009 | Nakadai et al. |
| 2014/0067385 A1 | 3/2014 | Oliveira et al. |
| 2015/0095026 A1* | 4/2015 | Bisani .................. G10L 15/08 704/232 |

(Continued)

FOREIGN PATENT DOCUMENTS

JP    2008085472 A    4/2008

OTHER PUBLICATIONS

"International Search Report and Written Opinion Issued in PCT Application No. PCT/US2018/034816", dated Sep. 7, 2018, 13 Pages.

(Continued)

*Primary Examiner* — Kenny H Truong
(74) *Attorney, Agent, or Firm* — Wade IP Law LLC

(57) ABSTRACT

Techniques are described herein that are capable of performing sound source localization (SSL) confidence estimation using machine learning. An SSL operation is performed with regard to a sound to determine an SSL direction estimate and an SSL-based confidence associated with the SSL direction estimate based at least in part on a multi-channel representation of the sound. The SSL direction estimate indicates an estimated direction from which the sound is received. The SSL-based confidence indicates an estimated probability that the sound is received from the estimated direction. The multi-channel representation includes representations of the sound that are detected by respective sensors (e.g., microphones). Additional characteristic(s) of the sound are auto- (Continued)

matically determined. A machine learning (ML) operation is performed based at least in part on the SSL direction estimate, the SSL-based confidence, and the additional characteristic(s) to determine an ML-based confidence associated with the SSL direction estimate.

20 Claims, 6 Drawing Sheets

(56) References Cited

U.S. PATENT DOCUMENTS

2018/0115848 A1* 4/2018 Kitazawa ............... H04R 3/005
2018/0359560 A1* 12/2018 Defraene ............... H04R 1/406
2018/0374495 A1* 12/2018 Fienberg ............. G10L 21/0216

OTHER PUBLICATIONS

Kayser, et al., "A Discriminative Learning Approach to Probabilistic Acoustic Source Localization", In IEEE 14th International Workshop on Acoustic Signal Enhancement, Sep. 8, 2014, 5 Pages.

Bechler, et al., "Three Different Reliability Criteria for Time Delay Estimates", In IEEE 12th European Signal Processing Conference, Sep. 6, 2004, 5 Pages.

Rudzyn, et al., "Real Time Robot Audition System Incorporating both 3D Sound Source Localisation and Voice Characterisation", In IEEE International Conference on Robotics and Automation, Apr. 10, 2007, 6 Pages.

Takeda, et al., "Sound Source Localization Based on Deep Neural Networks With Directional Activate Function Exploiting Phase Information", In Proceedings of IEEE International Conference on Acoustics, Speech and Signal Processing, Mar. 20, 2016, pp. 405-409.

Lopatka, et al., "Detection, classification and localization of acoustic events in the presence of background noise for acoustic surveillance of hazardous situations", In Journal of Multimedia Tools and Applications, vol. 75, Issue 17, Sep. 2016, pp. 10407-10439.

Luo, et al., "Gaussian Process Models for HRTF based Sound-Source Localization and Active-Learning", In IEEE Journal of Selected Topics in Signal Processing, Mar. 2014, pp. 1-11.

Czyzewski, Andrzej, "Automatic identification of sound source position employing neural networks and rough sets", In Journal of Pattern Recognition Letters, vol. 24, Issue 6, Mar. 2003, pp. 921-933.

Houegnigan, et al., "Neural Networks for High Performance Time-Delay Estimation and Acoustic Source Localization", In Proceedings of Second International Conference on Computer Science, Information Technology and Applications, Jan. 2017, pp. 137-146.

Yalta, et al., "Sound Source Localization Using Deep Learning Models", In Journal of Robotics and Mechatronics, vol. 29, No. 1, Feb. 20, 2017, 2 pages.

* cited by examiner

SOUND SOURCE LOCALIZATION CONFIDENCE ESTIMATION USING MACHINE LEARNING

BACKGROUND

Sound source localization (SSL) is a growing area of technology given the rise of consumer-level multi-microphone arrays. SSL is often utilized to determine from which direction a sound originates by analyzing the sound as detected by multiple microphones having a known geometry. SSL techniques typically output a probability distribution of potential arrival angles over a working angular space or a single estimate of an arrival angle (i.e., SSL angle estimate) with a corresponding confidence metric.

The confidence metric is traditionally derived directly from an algorithm that implements the SSL technique using a steered beamformer (SB) method or a time-difference of arrival (TDOA) method. SB-based methods point a beamformer at different angles to receive the sound and derive confidence based on the energy in the strongest beam (i.e., post-beamformer signal level) compared to a long-run baseline energy or compared to the energy in beams at other angles. TDOA-based methods derive confidence from the correlation between signals that are recorded by the microphones. Traditionally, the SSL angle estimate, weighted by the confidence metric, is used with a time-averaging filter in order to obtain a robust and stable estimate, which may indicate the location of sound source(s) that produce the sound. However, the time-averaging filter may cause the SSL angle estimate to have a relatively long settling time, which is an issue when multiple switching sources exist (e.g., a two-person conversation).

Moreover, although SB-based methods and TDOA-based methods can provide reasonably accurate SSL angle estimates and corresponding confidence metrics in some conditions, such methods may not be adequately robust in other conditions. For instance, during the tail end of a speech fragment, the sound in a reflected path may be more correlated and/or have higher energy than the sound in the direct path, which may lead the SSL technique to output a high confidence in the wrong direction (e.g., angle). Conventional SSL techniques typically rely on a single feature (i.e., beam strength or correlation) to determine confidence metrics, which may negatively impact accuracy of the confidence metrics.

SUMMARY

Various approaches are described herein for, among other things, performing sound source localization (SSL) confidence estimation using machine learning. SSL is a technique that estimates a direction from which a sound is received. The estimate of the direction that is provided by SSL is referred to herein as an "SSL direction estimate." SSL also estimates a probability that the sound is received from the estimated direction. The estimated probability is said to be a confidence in the estimated direction. Accordingly, the estimated probability is referred to herein as an "SSL-based confidence" associated with the SSL direction estimate. Machine learning (ML) is a technique by which a computing system learns from data to enable the computing system to make data-driven decisions (e.g., predictions) without having to be explicitly programmed. Machine learning can be used to provide an updated (e.g., more accurate) confidence in the estimated direction. The updated confidence that is provided using machine learning is referred to herein as an "ML-based confidence" associated with the SSL direction estimate.

In an example approach, an SSL operation is performed with regard to a sound to determine an SSL direction estimate and an SSL-based confidence associated with the SSL direction estimate based at least in part on a multi-channel representation of the sound. The SSL direction estimate indicates an estimated direction from which the sound is received. The SSL-based confidence indicates an estimated probability that the sound is received from the estimated direction. The multi-channel representation includes representations of the sound that are detected by respective sensors (e.g., microphones). Additional characteristic(s) of the sound are automatically determined. Examples of a characteristic of the sound include but are not limited to a source (e.g., classification) of the sound and an environment in which the sound is produced. For example, the sound may be classified as human voice, a creak of a chair, a creak or slam of a door, or a slam of a table. In another example, the sound may be produced in a quiet room, in a very open space (e.g., outdoors), in a reverberant (e.g., resonant) space, or in a space that has substantial background noise. A machine learning (ML) operation is performed based at least in part on the SSL direction estimate, the SSL-based confidence, and the additional characteristic(s) to determine an ML-based confidence associated with the SSL direction estimate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
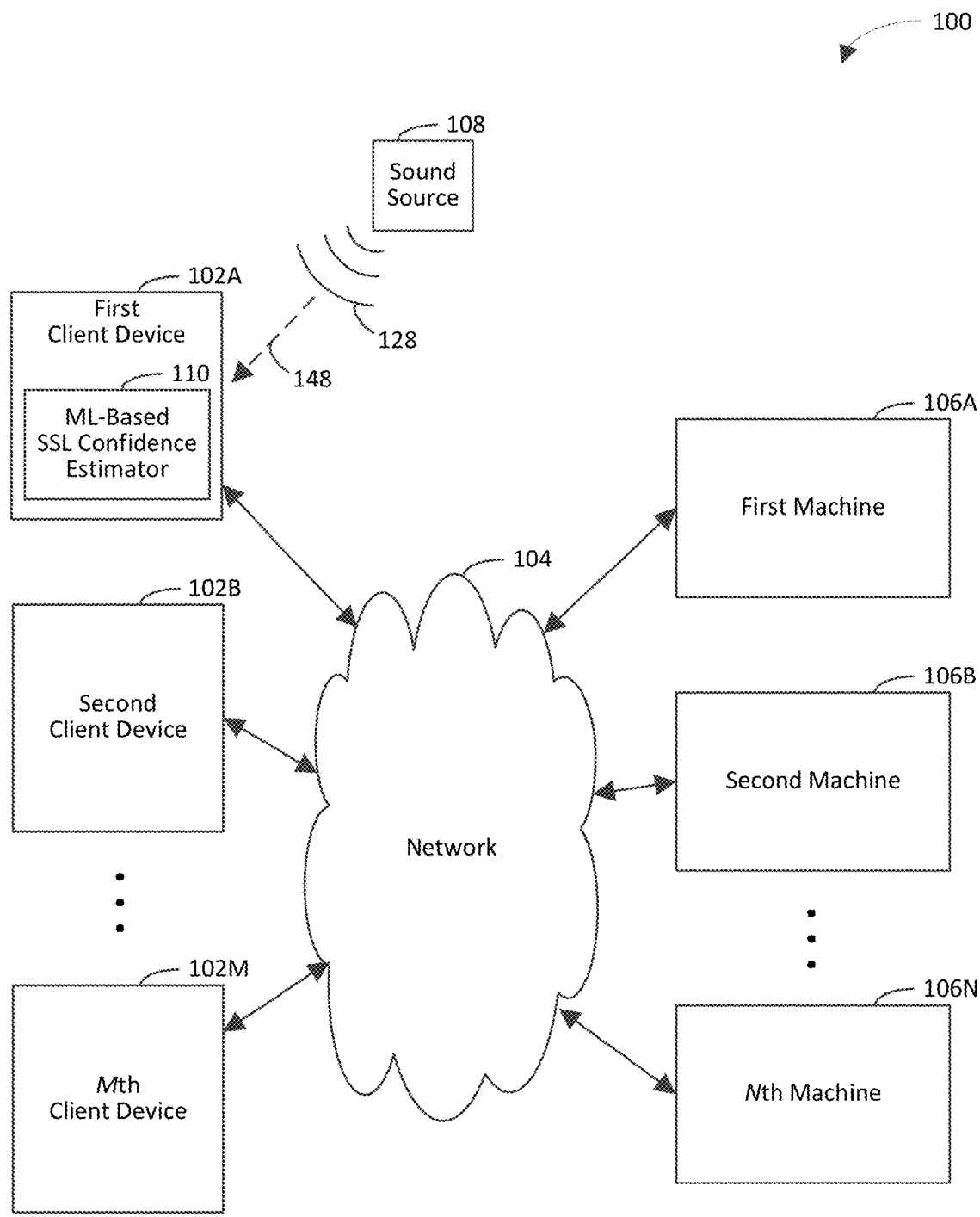
FIG. 1 is a block diagram of an example ML-based SSL confidence estimation system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of performing sound source localization (SSL) confidence estimation using machine learning (e.g., supervised machine learning). SSL is a technique that estimates a direction from which a sound is received. The estimate of the direction that is provided by SSL is referred to herein as an "SSL direction estimate." SSL also estimates a probability that the sound is received from the estimated direction. The estimated probability is said to be a confidence in the estimated direction. Accordingly, the estimated probability is referred to herein as an "SSL-based confidence" associated with the SSL direction estimate. Machine learning (ML) is a technique by which a computing system learns from data to enable the computing system to make data-driven decisions (e.g., predictions) without having to be explicitly programmed. Machine learning (e.g., inference and/or training) can be used to provide an updated (e.g., more accurate) confidence in the estimated direction. The updated confidence that is provided using machine learning is referred to herein as an "ML-based confidence" associated with the SSL direction estimate.

Example techniques described herein have a variety of benefits as compared to conventional techniques for estimating confidence in SSL direction estimates. For instance, the example techniques may provide more accurate confidence estimates for SSL direction estimates than the conventional techniques. The example techniques may be capable of aggregating multiple features to provide the more accurate confidence estimates.

A feature set that is used to determine the confidence estimates may be updated to include new feature(s) automatically and/or relatively quickly by utilizing machine learning; whereas, updating a feature set for the conventional techniques typically is performed manually, which often consumes a substantial amount of resources (e.g., development time, memory, and/or processor cycles). Accordingly, the example techniques may reduce an amount of resources that is consumed to determine a confidence estimate and/or to update a feature set that is used to determine the confidence estimate. New feature(s) that are added to a feature set may be integrated directly into the confidence estimation, for example, to improve the robustness of the confidence estimation. The example techniques may be capable of efficiently integrating a relatively large number of features and maintaining generality of the techniques.

The example techniques may be capable of distinguishing between different types of sounds (e.g., human voice, a creak of a chair, a creak or slam of a door, and a slam of a table). For instance, in some applications involving audio/video communications, only certain types of sounds (e.g., human voice) are of interest. The example techniques may be capable of taking into consideration the type of a sound (e.g., using classification techniques) in generating the confidence estimate regarding the sound. For example, greater confidence can be given to SSL direction estimates associated with the types of sounds that are of interest, and/or lesser confidence can be given to SSL direction estimates associated with types of sounds that are not of interest. Accordingly, the ML-based confidence associated with an SSL direction estimate may be increased relative to the corresponding SSL-based confidence for desired sounds and/or decreased relative to the corresponding SSL-based confidence for sounds that are not desired. The ML-based confidence may be set sufficiently low for sounds that are not desired that the SSL direction estimates for such sounds are effectively excluded from consideration in subsequent processing. By using classification and improving accuracy of the confidence metric, the example techniques may substantially simplify post-processing (e.g., post-SSL smoothing). The example techniques may increase contextual awareness (e.g., of a user or an environment).

The example techniques may increase developer efficiency. For example, by utilizing machine learning to incorporate new features into a feature set, the example techniques may reduce a number of steps that are performed by the developer, an amount of effort that the developer expends, and/or an amount of time that the developer takes to incorporate such features into the feature set for determining the confidence estimates.

FIG. 1 is a block diagram of an example ML-based SSL confidence estimation system 100 in accordance with an embodiment. Generally speaking, the ML-based SSL confidence estimation system 100 operates to provide information to users in response to requests (e.g., hypertext transfer protocol (HTTP) requests) that are received from the users. The information may include documents (e.g., web pages, images, audio files, video files, etc.), output of executables, and/or any other suitable type of information. In accordance with example embodiments described herein, the ML-based SSL confidence estimation system 100 performs SSL confidence estimation using machine learning. Detail regarding techniques for performing SSL confidence estimation using machine learning is provided in the following discussion.

As shown in FIG. 1, the ML-based SSL confidence estimation system 100 includes a plurality of client devices 102A-102M, a network 104, a plurality of machines 106A-106N, and a sound source 108. Communication among the client devices 102A-102M and the machines 106A-106N is carried out over the network 104 using well-known network communication protocols. The network 104 may be a wide-area network (e.g., the Internet), a local area network (LAN), another type of network, or a combination thereof.

The client devices 102A-102M are processing systems that are capable of communicating with the machines 106A-106N. An example of a processing system is a system that includes at least one processor that is capable of manipulating data in accordance with a set of instructions. For instance, a processing system may be a computer, a personal digital assistant, etc. The client devices 102A-102M are configured to provide requests to the machines 106A-106N for requesting information stored on (or otherwise accessible via) the machines 106A-106N. For instance, a user may initiate a request for executing a computer program (e.g., an application) using a client (e.g., a Web browser, Web crawler, or other type of client) deployed on a client device 102 that is owned by or otherwise accessible to the user. In accordance with some example embodiments, the client devices 102A-102M are capable of accessing domains (e.g., Web sites) hosted by the servers 104A-104N, so that the client devices 102A-102M may access information that is available via the domains. Such domains may include web pages, which may be provided as hypertext markup language (HTML) documents and objects (e.g., files) that are linked therein, for example.

The client devices 102A-102M may include any client-enabled system or device, including but not limited to a desktop computer, a laptop computer, a tablet computer, a personal digital assistant, a cellular telephone, a wearable device, or the like. It will be recognized that any one or more client devices 102A-102M may communicate with any one or more machines 106A-106N.

The first client device 102A is shown to include the ML-based SSL confidence estimator 110 for illustrative purposes. The ML-based SSL confidence estimator 110 is configured to perform SSL confidence estimation using machine learning. In an example implementation, the ML-based SSL confidence estimator 110 performs an SSL operation with regard to a sound 128 that is produced by the sound source 108 to determine an SSL direction estimate and an SSL-based confidence associated with the SSL direction estimate based at least in part on a multi-channel representation of the sound. The SSL direction estimate indicates an estimated direction from which the sound 128 is received. The estimated direction is an estimate of the actual direction 148 from which the sound 128 is received. The SSL-based confidence indicates an estimated probability that the sound 128 is received from the estimated direction. The multi-channel representation includes representations of the sound that are detected by respective sensors (e.g., microphones). The ML-based SSL confidence estimator 110 may chunk each representation of the sound 128 into multiple frames corresponding to respective periods of time. For instance, each period of time may have a duration of 10 millisecond (ms) or 20 ms. Accordingly, the ML-based SSL confidence estimator 110 may perform the SSL operation with regard to each frame of each representation of the sound 128 to determine an SSL direction estimate and an associated SSL-based confidence for each frame.

The ML-based SSL confidence estimator 110 determines additional characteristic(s) of the sound 128. Examples of a characteristic of the sound 128 include but are not limited to a type (e.g., classification) of the sound 128 and an environment in which the sound 128 is produced. For example, the ML-based SSL confidence estimator 110 may determine that the sound 128 is any suitable type, including but not limited to human voice, a creak of a chair, a creak or slam of a door, or a slam of a table. In another example, the ML-based SSL confidence estimator 110 may determine that the environment in which the sound 128 is produced is a quiet room, an open space (e.g., outdoors), a reverberant (e.g., resonant) space, or a space that has substantial background noise. It will be recognized that the ML-based SSL confidence estimator 110 may determine additional characteristic(s) of each frame of each representation of the sound 128.

The ML-based SSL confidence estimator 110 performs a machine learning operation (e.g., inference operation or training operation) based at least in part on the SSL direction estimate, the SSL-based confidence, and the additional characteristic(s) to determine an ML-based confidence associated with the SSL direction estimate. It will be recognized that the ML-based SSL confidence estimator 110 may perform the machine learning operation with regard to each frame of each representation of the sound 128 to determine an ML-based confidence for each frame The machines 106A-106N are processing systems that are capable of communicating with the client devices 102A-102M. The machines 106A-106N are configured to execute computer programs that provide information to users in response to receiving requests from the users. For example, the information may include documents (e.g., web pages, images, audio files, video files, etc.), output of executables, or any other suitable type of information. In accordance with some example embodiments, the machines 106A-106N are configured to host respective Web sites, so that the Web sites are accessible to users of the ML-based SSL confidence estimation system 100.

The sound source 108 produces the sound 128 that is received by the ML-based SSL confidence estimator 110.

The ML-based SSL confidence estimator 110 is shown to be incorporated in the first client device 102A for illustrative purposes and is not intended to be limiting. It will be recognized that at least a portion (e.g., all) of the ML-based SSL confidence estimator 110 may be external to the first client device 102A. For example, at least a portion of the ML-based SSL confidence estimator 110 may be incorporated in any one or more of the machines 106A-106N. In accordance with this example, client-side aspects of the ML-based SSL confidence estimator 110 may be incorporated in the first client device 102A, and server-side aspects of the ML-based SSL confidence estimator 110 may be incorporated in one or more of the machines 106A-106N.

The ML-based SSL confidence estimator 110 may be implemented in various ways to perform SSL confidence estimation using machine learning, including being implemented in hardware, software, firmware, or any combination thereof. For example, the ML-based SSL confidence estimator 110 may be implemented as computer program code configured to be executed in one or more processors. In another example, the ML-based SSL confidence estimator 110 may be implemented as hardware logic/electrical circuitry. For instance, the ML-based SSL confidence estimator 110 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Example techniques for performing SSL confidence estimation using machine learning are discussed in greater detail below with reference to FIGS. 2-4.

Figure 2:
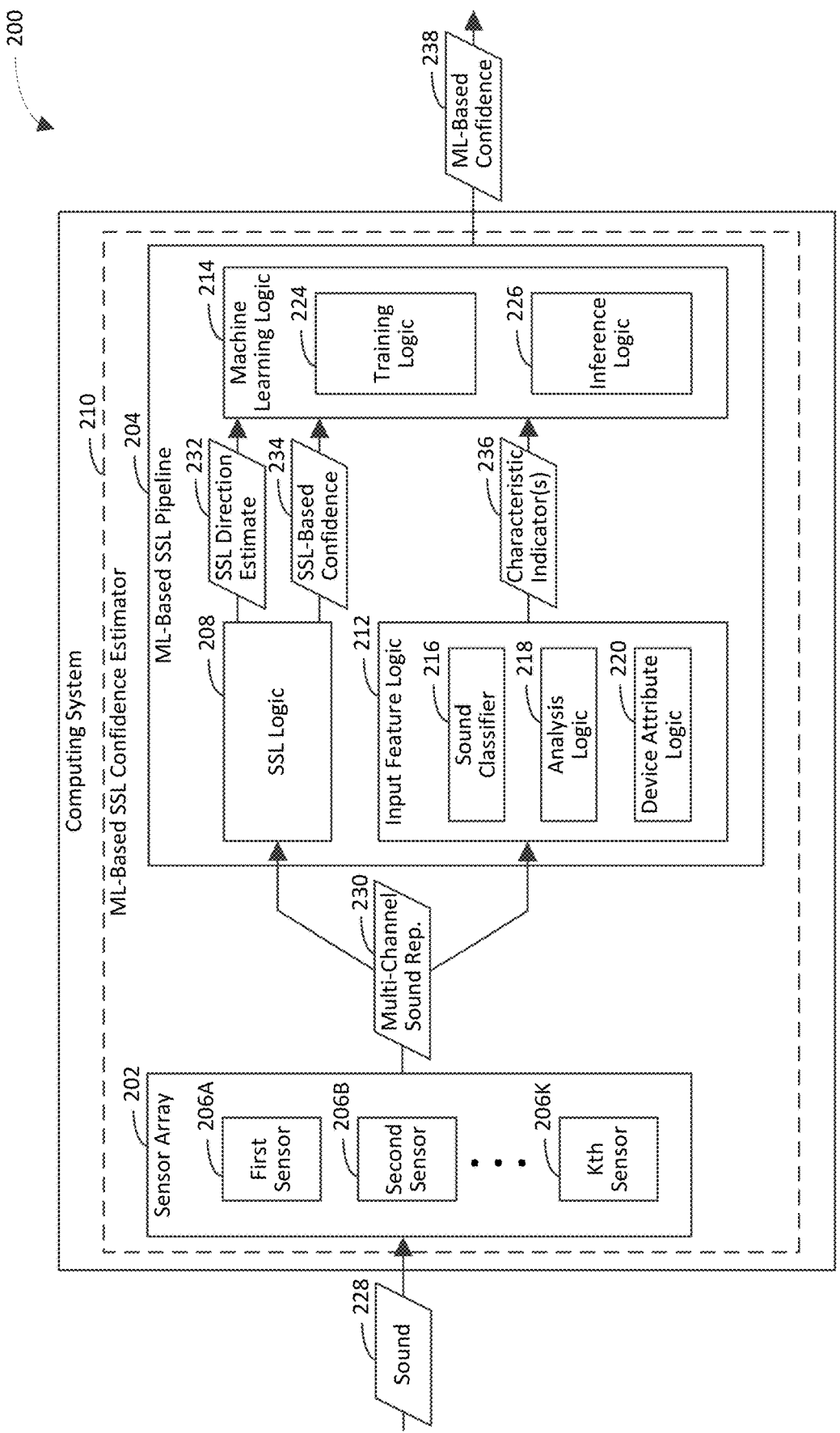
FIGS. 2 and 4 are block diagrams of example computing systems in accordance with embodiments.

FIG. 2 is a block diagram of an example computing system 200 in accordance with an embodiment. The computing system 200 may be an example implementation of any one or more of the client devices 102A-102M shown in FIG. 1, any one or more of the machines 106A-106N shown in FIG. 1, or any combination thereof, though the scope of the example embodiments is not limited in this respect. As shown in FIG. 2, the computing system 200 includes an ML-based SSL confidence estimator 210, which is an example implementation of an ML-based SSL confidence estimator 110 shown in FIG. 1. The ML-based SSL confidence estimator 210 is configured to perform SSL confidence estimation using machine learning.

The ML-based SSL confidence estimator 210 includes a sensor array 202 and an ML-based SSL pipeline 204. The sensor array 202 includes multiple sensors (e.g., microphones) 206A-206K, which are configured to detect a sound 228. Each of the sensors 206A-206K generates a respective representation of the sound 228. For instance, each of the sensors 206A-206K may include a respective transducer that converts the sound 228, as detected by the respective sensor, into a respective electrical signal. Each of the representations may differ from the other representations based at least in part on the location of the respective sensor with reference to the location of the sound source (e.g., sound source 108) from which the sound 228 is received and/or operational characteristics of the respective sensor. The representations of the sound 228 that are generated by the respective sensors 206A-206K are referred to collectively as a multi-channel sound representation 230.

In one example implementation, the multi-channel sound representation 230 represents a raw sound. In accordance with this implementation, the multi-channel sound representation 230 is not pre-processed before being forwarded to the ML-based SSL pipeline 204. The processing that is to be performed by the ML-based SSL pipeline 204 may be streaming-based (e.g., real-time) or performed offline (e.g., after being completely recorded).

In another example implementation, the multi-channel sound representation 230 is a pre-processed representation of the sound 228. In accordance with this implementation, an original sound may be processed to separate the original sound into multiple sounds (e.g., sounds of different types). In further accordance with this implementation, the sound 228 may be one of the multiple sounds that resulted from separating the original sound. For instance, the sounds that resulted from separating the original sound may be processed by the ML-based SSL pipeline 204 separately.

The ML-based SSL pipeline 204 includes SSL logic 208, input feature logic 212, and machine learning logic 214. The SSL logic 208 is configured to perform an SSL operation with regard to the sound 228, which includes analyzing the multi-channel sound representation 230 to generate an SSL direction estimate 232 and an SSL-based confidence 234 associated with the SSL direction estimate 232. Accordingly, it can be said that the SSL logic 208 converts the multi-channel sound representation 230 into the SSL direction estimate 232 and the SSL-based confidence 234. The SSL direction estimate 232 indicates an estimated direction from which the sound 228 is received. The estimated direction is an estimate of the actual direction 148 from which the sound 128 is received. In one example implementation, the SSL direction estimate 232 includes an angle or a vector in a two-dimensional space or a three-dimensional space to indicate the estimated direction. The SSL-based confidence 234 indicates an estimated probability that the sound 228 is received from the estimated direction.

The SSL operation may use a steered beamformer technique or a time-difference of arrival (TDOA) technique to determine the SSL direction estimate 232 and the SSL-based confidence 234, though the scope of the example embodiments is not limited in this respect. It will be recognized that the SSL operation may use any suitable technique to determine the SSL direction estimate 232 and the SSL-based confidence 234.

In the steered beamformer technique, the SSL logic 208 uses a beamformer to generate a beam for detecting sound (e.g., the sound 228). The SSL logic 208 causes the beamformer to be pointed in various directions and obtains a measurement of the sound while the beamformer is pointed in each direction. Each measurement indicates an intensity (e.g., signal level) of the sound that is detected in the respective direction. The SSL logic 208 analyzes the multi-channel sound representation 230 to calculate respective probabilities that the sound is received from the respective directions. For instance, the SSL logic 208 may generate a probability distribution that indicates the directions and the corresponding probabilities. The SSL logic 208 selects the direction corresponding to the measurement that indicates the greatest intensity to serve as the SSL direction estimate 232. The SSL logic 208 selects the probability associated with the aforementioned direction to serve as the SSL-based confidence 234.

In the TDOA technique, the SSL logic 208 determines a time of arrival of correlated sound (e.g., sound 228) at each of the sensors 206A-206K. The multi-channel sound representation 230 indicates the times of arrival associated with the respective representations of the sound that are detected by the respective sensors 206A-206K. The SSL logic 208 analyzes differences between the times of arrival of the sound to determine the direction from which the sound arrives. The sensors 206A-206K may have respective synchronized time references to enable differences between the times of arrival of the sound at the respective sensors 206A-206K to be calculated relatively accurately. The SSL logic 208 determines the SSL direction estimate 232 and the SSL-based confidence 234 based at least in part on the correlation between the representations of the sound.

Regardless whether the steered beamformer technique, the TDOA technique, or another technique is used, the SSL logic 208 may filter SSL direction estimates and their corresponding SSL-based confidences over time (e.g., using time-averaging filters) to determine the SSL direction estimate 232 and the SSL-based confidence 234 that are to be processed by the machine learning logic 214.

The input feature logic 212 is configured to determine additional characteristic(s) of the sound 228. The input feature logic 212 generates characteristic indicator(s), which specify the additional characteristic(s). The input feature logic 212 includes a sound classifier 216, analysis logic 218, and device attribute logic 220. The sound classifier 216 is configured to classify the sound 228 into a designated class selected from multiple classes based at least in part on attribute(s) of the multi-channel sound representation 230.

The analysis logic 218 is configured to perform various types of analyses on the multi-channel sound representation 230 and/or an environment in which the sound 228 is produced. For example, the analysis logic 218 may include a frequency analyzer configured to perform a frequency analysis on the multi-channel sound representation 230 to determine a frequency response of the multi-channel sound representation 230. In accordance with this example, the frequency analyzer may determine (e.g., derive) characteristic(s) of the sound 228 and/or the environment based at least in part on the frequency response. In another example, the analysis logic 218 may include an environment analyzer configured to perform an analysis of the environment to determine characteristic(s) thereof. The environment analyzer may include a frequency analyzer, a camera, or other component capable of gathering information regarding characteristics of the environment. For instance, the camera may capture images of the environment that indicate an openness or reverberance of the space in which the sound 228 is produced, locations of objects in the space, a number of people in the space, or other potential speakers or distractors in the space. In yet another example, the analysis logic 218 determines the times at which the sound 228 is received at the respective sensors 206A-206K. In accordance with this example, the analysis logic 218 may determine to which estimated directions the times correspond.

The device attribute logic 220 is configured to determine attribute(s) of the computing system 200. For example, the device attribute logic 220 may determine that the sound 228 is received from a speaker that is included in the computing system 200. For instance, the sound 228 may be music playing as background entertainment or communication (e.g., voice of a local user of the computing system 200 or a remote user who is communicating with local user) that occurs during a VoIP call. Such music or communication may not be of interest for purposes of SSL. Accordingly, a relatively low weight may be assigned to an ML-based confidence associated with the music or communication when processed by the machine learning logic 214, which is discussed in further detail below. In another example, the device attribute logic 220 may determine that one or more of the sensors 206A-206K are not accurately detecting the sound 228.

In some example embodiments, the sound classifier 216 utilizes the frequency response, which is determined by the analysis logic 218, to classify the sound 228. For example, the sound classifier 216 may analyze the frequency response to determine that attribute(s) of the frequency response match corresponding attribute(s) of a reference frequency response that is associated with a designated class. In accordance with this example, the sound classifier 216 may classify the sound 228 into the designated class based at least in part on the attribute(s) of the frequency response matching the corresponding attribute(s) of the reference frequency response.

The machine learning logic 214 is configured to perform a machine learning operation (e.g., inference operation or training operation), which analyzes the SSL direction estimate 232, the SSL-based confidence 234, and the characteristic indicator(s) 236, to generate an ML-based confidence 238 associated with the SSL direction estimate 232. For instance, the ML-based confidence 238 may indicate an estimated probability that the sound 228 is received from the estimated direction that is more accurate than the estimated probability indicated by the SSL-based confidence 234. The machine learning logic 214 may be further configured to assign a weight to the ML-based confidence 238 depending on whether the sound 228 to which the ML-based confidence 238 corresponds is of interest. For instance, if the sound 228 is of relatively low interest, the machine learning logic 214 may assign a relatively low weight to the ML-based confidence 238. If the sound is of relatively high interest, the machine learning logic 214 may assign a relative high weight to the ML-based confidence 238. The weight may indicate an extent to which the ML-based confidence 238 is considered (e.g., relied upon) in subsequent processing.

In some example embodiments, the machine learning logic 214 uses a neural network to perform the machine learning operation. Examples of a neural network include but are not limited to a feed forward neural network and a long short-term memory (LSTM) neural network. A feed forward neural network is an artificial neural network for which connections between units in the neural network do not form a cycle. The feed forward neural network allows data to flow forward (e.g., from the input nodes toward to the output nodes), but the feed forward neural network does not allow data to flow backward (e.g., from the output nodes toward to the input nodes). In an example embodiment, the machine learning logic 214 employs a feed forward neural network to train the machine learning model that is used to determine ML-based confidences.

An LSTM neural network is a recurrent neural network that has memory and allows data to flow forward and backward in the neural network. The LSTM neural network is capable of remembering values for short time periods or long time periods. Accordingly, the LSTM neural network may keep stored values from being iteratively diluted over time. In one example, the LSTM neural network may be capable of storing information regarding additional characteristics of sounds gathered by the input feature logic 212 over time. For instance, the LSTM neural network may generate a model of an environment (e.g., the environment in which the sounds are received) by utilizing such information. In another example, the LSTM neural network may be capable of remembering relationships between multi-channel representations of sounds, additional characteristics of the sounds, SSL direction estimates and SSL-based confidences associated with the multi-channel representations of the sounds, and ML-based confidences that are derived therefrom.

The machine learning logic 214 includes training logic 224 and inference logic 226. The training logic 224 is configured to train a machine learning algorithm that the inference logic 226 uses to determine (e.g., infer) the ML-based confidence 238. For instance, the training logic 224 may provide sample SSL direction estimates, sample SSL-based confidences, and sample characteristic indicator(s) as inputs to the algorithm to train the algorithm. For instance, the sample data may be labeled. The machine learning algorithm is configured to derive relationships between the sample SSL direction estimates, the sample SSL-based confidences, the sample characteristic indicator(s), and the resulting ML-based confidences. The inference logic 226 is configured to utilize the machine learning algorithm, which is trained by the training logic 224, to determine the ML-based confidence 238 when the SSL direction estimate 232, the SSL-based confidence 234, and the characteristic indicator(s) 236 are provided as inputs to the algorithm.

Figure 3:
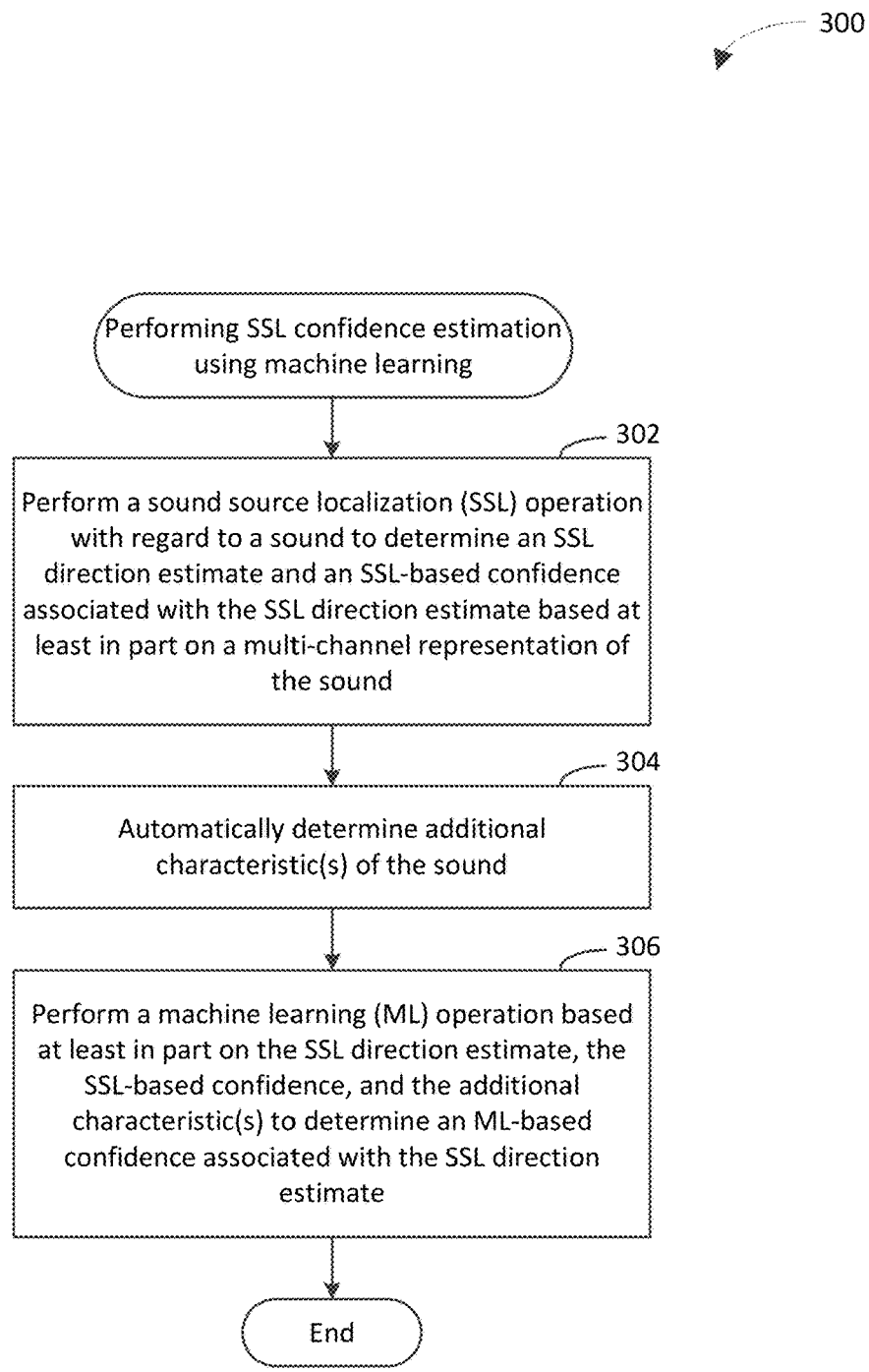
FIG. 3 depicts a flowchart of an example method for performing SSL confidence estimation using machine learning in accordance with an embodiment.

FIG. 3 depicts a flowchart 300 of an example method for performing SSL confidence estimation using machine learning in accordance with an embodiment. Flowchart 300 may be performed by any one or more of client devices 102A-102M and/or any one or more of machines 106A-106N shown in FIG. 1, for example. For illustrative purposes, flowchart 300 is described with respect to the computing system 200 shown in FIG. 2. Further structural and operational embodiments will be apparent to persons skilled in the relevant art(s) based on the discussion regarding flowchart 300.

As shown in FIG. 3, the method of flowchart 300 begins at step 302. In step 302, a sound source localization (SSL) operation is performed with regard to a sound to determine an SSL direction estimate and an SSL-based confidence associated with the SSL direction estimate based at least in part on a multi-channel representation of the sound. The SSL direction estimate indicates an estimated direction from which the sound is received. The SSL-based confidence indicates an estimated probability that the sound is received from the estimated direction. The multi-channel representation includes representations of the sound that are detected by respective sensors (e.g., microphones).

In an example implementation, the SSL logic 208 performs the SSL operation with regard to the sound 228 to determine the SSL direction estimate 232 and the SSL-based confidence 234 associated with the SSL direction estimate 232 based at least in part on the multi-channel sound representation 230. The SSL direction estimate 232 indicates the estimated direction from which the sound 228 is received. The SSL-based confidence 234 indicates the estimated probability that the sound 228 is received from the estimated direction. The multi-channel sound representation 230 includes representations of the sound 228 that are detected by respective the respective sensors 206A-206K.

At step 304, additional characteristic(s) of the sound are automatically determined. In an example implementation, the input feature logic 212 automatically determines the additional characteristic(s). In accordance with this implementation, the input feature logic 212 may generate the characteristic indicator(s) 236 to specify the additional characteristic(s).

At step 306, a machine learning (ML) operation is performed based at least in part on the SSL direction estimate, the SSL-based confidence, and the additional characteristic(s) to determine an ML-based confidence associated with the SSL direction estimate. In an example implementation, the machine learning logic 214 performs the machine learning operation based at least in part on the SSL direction estimate 232, the SSL-based confidence 234, and the additional characteristic(s) to determine the ML-based confidence 238 associated with the SSL direction estimate 232. In accordance with this implementation, the machine learning logic 214 may review the characteristic indicator(s) 236 to identify the additional characteristic(s) specified therein.

In an example embodiment, the machine learning operation performed at step 306 is a training operation that facilitates generating a feature set of a machine learning model. The machine learning model is usable in a subsequent machine learning inference operation to determine an ML-based confidence inference based at least in part on a second SSL direction estimate that indicates a second estimated direction from which a second sound is received, a second SSL-based confidence that indicates an estimated probability that the second sound is received from the second estimated direction, and additional characteristic(s) of the second sound. In an example implementation, training logic 224 performs the machine learning operation to facilitate the generation of the feature set of the machine learning model.

In another example embodiment, the machine learning operation performed at step 306 is an inference operation that utilizes a feature set of a machine learning model based at least in part on the SSL direction estimate, the SSL-based confidence, and the additional characteristic(s) to determine the ML-based confidence associated with the SSL direction estimate. In an example implementation, inference logic 226 utilizes the feature set of the machine learning model to perform the machine learning operation.

In yet another example embodiment, the machine learning operation is performed at step 306 further to determine an updated estimate, indicating a different estimated direction from which the sound is received. For example, a determination may be made that the sound is more likely to have been received from the different estimated direction, which is indicated by the updated estimate, than the estimated direction indicated by the SSL direction estimate. In accordance with this example, the updated estimate may be associated with a confidence that is greater than the SSL-based confidence.

In still another example embodiment, the machine learning operation is capable of incorporating arbitrary features associated with respective characteristics of the sound into a determination of the ML-based confidence on-the-fly without a manual modification of code associated with the machine learning operation to accommodate the arbitrary features. Accordingly, the machine learning operation may be extensible and/or feature-agnostic.

In an example embodiment, automatically determining the additional characteristic(s) at step 304 includes automatically determining a probability that the sound is of a designated type. For instance, the designated type may be voice, a creak of a chair, a creak of a door, a door slam, or a slam of a table. If the designated type is voice, a voice activity detection operation may be performed to automatically determine the probability that the sound corresponds to voice. In accordance with this embodiment, the machine learning operation is performed at step 306 based at least in part on the SSL direction estimate, the SSL-based confidence, and the probability to determine the ML-based confidence associated with the SSL direction estimate.

In an aspect of this embodiment, automatically determining the additional characteristic(s) at step 304 includes classifying the sound to be the designated type selected from multiple types based at least in part on the probability. In accordance with this aspect, performing the machine learning operation at step 306 includes determining the ML-based confidence to be more accurate than the SSL-based confidence based at least in part on the sound being classified to be the designated type. For instance, the ML-based confidence may be determined to be greater than or less than the SSL-based confidence, corresponding to whether the sound is the designated type. If the sound is the designated type, determining the ML-based confidence to be more accurate than the SSL-based confidence includes determining the ML-based confidence to be greater than the SSL-based confidence. If the sound is not the designated type, determining the ML-based confidence to be more accurate than the SSL-based confidence includes determining the ML-based confidence to be less than the SSL-based confidence.

In an example of this aspect, automatically determining the additional characteristic(s) at step 304 includes performing a frequency analysis operation with respect to the sound to determine a frequency response of the sound. In accordance with this aspect, automatically determining the additional characteristic(s) at step 304 further includes determining that the frequency response corresponds to the designated type. In further accordance with this aspect, the ML-based confidence is determined to be more accurate than the SSL-based confidence further based at least in part on the frequency response corresponding to the designated type.

In another example embodiment, automatically determining the additional characteristic(s) at step 304 includes performing an analysis of an environment in which the sound is produced. In accordance with this embodiment, automatically determining the additional characteristic(s) at step 304 further includes determining a characteristic of the environment in which the sound is produced based at least in part on the analysis. Examples of a characteristic of an environment include but are not limited to noisiness (e.g., a quiet meeting room or a space having substantial background noise), openness (e.g., an open space, such as the outdoors), reverberance (e.g., a space having a substantial number of echoes). In further accordance with this embodiment, the machine learning operation is performed at step 306 based at least in part on the SSL direction estimate, the SSL-based confidence, and the characteristic of the environment to determine the ML-based confidence.

In an aspect of this embodiment, performing the analysis of the environment in which the sound is produced includes performing a frequency analysis operation with respect to the sound to determine a frequency response of the sound. In accordance with this aspect, the characteristic of the environment is determined based at least in part on the frequency response.

In another aspect of this embodiment, performing the analysis of the environment in which the sound is produced includes performing a review (e.g., analysis) of image(s) of the environment. In accordance with this aspect, the characteristic of the environment is determined based at least in part on the review of the image(s).

In yet another aspect of this embodiment, determining the characteristic of the environment includes determining that a volume of background noise in the environment is greater than or equal to a volume threshold. In accordance with this aspect, performing the machine learning operation at step 306 includes determining the ML-based confidence to be less than the SSL-based confidence based at least in part on a determination that the volume of the background noise in the environment is greater than or equal to the volume threshold.

In still another aspect of this embodiment, determining the characteristic of the environment includes determining that a volume of background noise in the environment is less than or equal to a volume threshold. In accordance with this aspect, performing the machine learning operation at step 306 includes determining the ML-based confidence to be greater than the SSL-based confidence based at least in part on a determination that the volume of the background noise in the environment is less than or equal to the volume threshold.

In yet another aspect of this embodiment, determining the characteristic of the environment includes determining that reverberance (e.g., resonance) of the environment is greater than or equal to a reverberance threshold. In accordance with this aspect, performing the machine learning operation at step 306 includes determining the ML-based confidence to be less than the SSL-based confidence based at least in part on a determination that the reverberance of the environment is greater than or equal to the reverberance threshold.

In still another aspect of this embodiment, determining the characteristic of the environment includes determining that reverberance of the environment is less than or equal to a reverberance threshold. In accordance with this aspect, performing the machine learning operation at step 306 includes determining the ML-based confidence to be greater than the SSL-based confidence based at least in part on a determination that the reverberance of the environment is less than or equal to the reverberance threshold.

In yet another example embodiment, the sound includes human voice. In accordance with this embodiment, automatically determining the additional characteristic(s) at step 304 includes determining that an attribute of the human voice causes detectability of the human voice to be compromised (e.g., to an extent that is greater than a compromise threshold). For example, a person who produces the human voice may speak at a relatively low volume (e.g., with reference to the background noise). In another example, the person may be turned away from the sensors and/or mumbling. In further accordance with this embodiment, performing the machine learning operation at step 306 includes determining the ML-based confidence to be less than the SSL-based confidence based at least in part on a determination that the attribute of the human voice causes the detectability of the human voice to be compromised.

In still another example embodiment, automatically determining the additional characteristic(s) at step 304 includes determining that a first sample of the sound, which is captured during a first time period, corresponds to the estimated direction. In accordance with this embodiment, automatically determining the additional characteristic(s) at step 304 further includes determining that a second sample of the sound, which is captured during a second time period that follows the first time period, corresponds to a second direction that is different from the estimated direction to which the first sample of the sound corresponds. In further accordance with this embodiment, performing the machine learning operation at step 306 includes determining the ML-based confidence to be more accurate than the SSL-based confidence based at least in part on the first sample of the sound corresponding to the estimated direction and further based at least in part on the first sample being captured before the second sample.

In yet another example embodiment, the sound includes human voice. In accordance with this embodiment, automatically determining the additional characteristic(s) at step 304 further includes performing the sound source localization operation at step 302 includes determining a first weight to be applied to the SSL-based confidence. In accordance with this embodiment, automatically determining the additional characteristic(s) at step 304 includes determining that the sound is received from a speaker of a device that performs the sound source localization operation. In further accordance with this embodiment, performing the machine learning operation at step 306 includes determining a second weight, which is to be applied to the ML-based confidence, to be less than the first weight based at least in part on a determination that the sound is received from the speaker of the device.

In some example embodiments, one or more steps 302, 304, and/or 306 of flowchart 300 may not be performed. Moreover, steps in addition to or in lieu of steps 302, 304, and/or 306 may be performed. For instance, in an example embodiment, the method of flowchart 300 further includes determining an angle in which to point a video camera in accordance with a dynamic video zoom operation based at least in part on the ML-based confidence. In an example implementation, machine learning logic 214 determines the angle in which to point the video camera.

In another example embodiment, the method of flowchart 300 further includes changing directionality of a beamformer steering operation associated with the sensors (e.g., changing a direction in which the beamformer is pointed) to correspond to the estimated direction from which the sound is received, as indicated by the SSL direction estimate, based at least in part on the ML-based confidence. For example, changing the directionality of the beamformer steering operation may include increasing accuracy of a transcription of communication that is included in the sound. In accordance with this example, the communication may be generated by a user whose location corresponds to the estimated direction.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Figure 4:
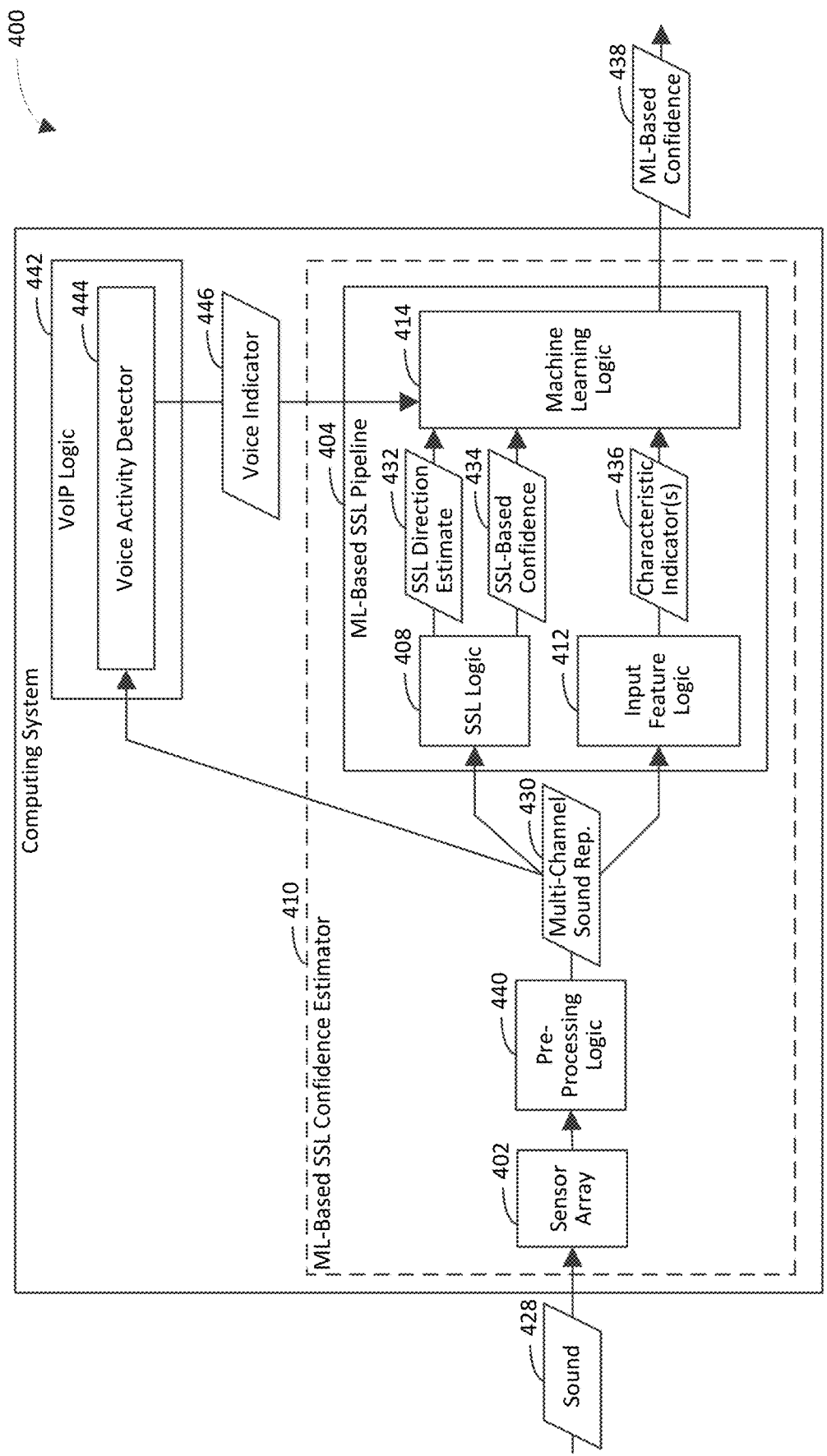

FIG. 4 is a block diagram of another example computing system 400 in accordance with an embodiment. The computing system 400 may be an example implementation of any one or more of the client devices 102A-102M shown in FIG. 1, any one or more of the machines 106A-106N shown in FIG. 1, or any combination thereof, though the scope of the example embodiments is not limited in this respect. As shown in FIG. 4, the computing system 400 includes Voice-over-Internet-Protocol (VoIP) logic 442 and an ML-based SSL confidence estimator 410. The VoIP logic 442 is configured to deliver voice communications and/or multimedia sessions over an Internet Protocol (IP) network, such as the Internet. For example, the VoIP logic 442 may enable a local user of the computing system 400 to communicate via the IP network with another user (i.e., remote user) who is located remotely from the computing system 400. In accordance with this example, the VoIP logic 442 may send digital representations of the local user's voice to the remote user via the IP network. In further accordance with this example, the VoIP logic 442 may process digital representations of the remote user's voice for presentation to the local user.

The VoIP logic 442 includes a voice activity detector 444 configured to detect voice. For instance, the voice activity detector 444 may detect voice in communications and/or media sessions between the local user and the remote user. The voice activity detector 444 may generate a voice indicator 446 in response to (e.g., based at least in part on) the voice activity detector 444 detecting voice.

The ML-based SSL confidence estimator 410 is an example implementation of an ML-based SSL confidence estimator 110 shown in FIG. 1. The ML-based SSL confidence estimator 410 is configured to perform SSL confidence estimation using machine learning. The ML-based SSL confidence estimator 410 includes a sensor array 402 and an ML-based SSL pipeline 404, which are operable in a manner similar to the sensor array 202 and the ML-based SSL pipeline 204 described above with reference to FIG. 2. For example, the sensor array 402 includes multiple sensors that detect the sound 428 and generate the respective representations of the sound 428, which are referred to cumulatively as a multi-channel sound representation 430.

The pre-processing logic 440 is configured to perform pre-processing operations on the multi-channel sound representation 430. For example, the pre-processing logic 440 may include at least a portion (e.g., all) of the activity detector 444. In accordance with this example, the pre-processing logic 440 may determine whether an audio frame that is included in the multi-channel sound representation 430 is a voice frame (i.e., a frame that includes voice). If the audio frame is a voice frame, the pre-processing logic 440 may forward the voice frame to the ML-based SSL pipeline 404 for SSL processing. If the audio frame is not a voice frame, the pre-processing logic 440 may not forward the audio frame to the ML-based SSL pipeline 404. For instance, the pre-processing logic 440 may cause SSL processing to be skipped for the audio frame if the audio frame is not a voice frame. Alternatively, the pre-processing logic 440 may forward the audio frame to the ML-based SSL pipeline 404 even if the audio frame is not a voice frame. For instance, machine learning logic 414, which is included in the ML-based SSL pipeline 404, may substantially reduce the ML-based confidence associated with the audio frame's SSL direction estimate 432 if the audio frame is forwarded to the ML-based SSL pipeline 404.

The ML-based SSL pipeline 404 includes SSL logic 408, input feature logic 412, and the machine learning logic 414, which are operable in a manner similar to the SSL logic 208, the input feature logic 212, and the machine learning logic 214 described above with reference to FIG. 2. It should be noted, however, that the machine learning logic 414 is configured to take into consideration the voice indicator 446, which is generated externally from the ML-based SSL pipeline 404 (and externally from the ML-based SSL confidence estimator 410), while performing machine learning operations. The SSL logic 408 is configured to perform an SSL operation with regard to the sound 428 to determine an SSL direction estimate 432 and an SSL-based confidence 434 associated with the SSL direction estimate 432. For instance, the SSL logic 408 may convert the multi-channel sound representation 430 into the SSL direction estimate 432 and the SSL-based confidence 434. The input feature logic 412 is configured to determine additional characteristic(s) of the sound 428 by analyzing the multi-channel sound representation 430. The machine learning logic 414 is configured to perform a machine learning operation based at least in part on the SSL direction estimate 432, the SSL-based confidence 434, the characteristic indicator(s) 436, and the voice indicator 446 to determine an ML-based confidence 438 associated with the SSL direction estimate 432.

Voice activity detection is one example of functionality that may be incorporated into the input feature logic 412. However, by incorporating the voice activity detector 444 into the VoIP logic 442 and enabling the machine learning logic 414 to utilize the voice indicator 446 that is generated by the voice activity detector 444, as shown in FIG. 4, a single voice activity detector may be utilized, rather than using a first voice activity detector for VoIP communications and a second voice activity detector for incorporation into the input feature logic 412. Accordingly, in an example embodiment, the voice activity detector 444 is located externally from the ML-based SSL pipeline 404. In an aspect of this embodiment, the voice activity detector 444 may be located externally from the ML-based SSL confidence estimator 410.

It will be recognized that the computing system 200 and 400 may not include all of the components shown in respective FIGS. 2 and 4. Furthermore, the computing systems 200 and 400 may include components in addition to or in lieu of the components shown in respective FIGS. 2 and 4.

Any one or more of the ML-based SSL confidence estimator 110, the ML-based SSL pipeline 204, the SSL logic 208, the input feature logic 212, the machine learning logic 214, the sound classifier 216, the analysis logic 218, the device attribute logic 220, the training logic 224, the inference logic 226, the ML-based SSL pipeline 404, the SSL logic 408, the input feature logic 412, the machine learning logic 414, the pre-processing logic 440, the VoIP logic 442, the voice activity detector 444, and/or flowchart 300 may be implemented in hardware, software, firmware, or any combination thereof.

For example, any one or more of the ML-based SSL confidence estimator 110, the ML-based SSL pipeline 204, the SSL logic 208, the input feature logic 212, the machine learning logic 214, the sound classifier 216, the analysis logic 218, the device attribute logic 220, the training logic 224, the inference logic 226, the ML-based SSL pipeline 404, the SSL logic 408, the input feature logic 412, the machine learning logic 414, the pre-processing logic 440, the VoIP logic 442, the voice activity detector 444, and/or flowchart 300 may be implemented, at least in part, as computer program code configured to be executed in one or more processors.

In another example, any one or more of the ML-based SSL confidence estimator 110, the ML-based SSL pipeline 204, the SSL logic 208, the input feature logic 212, the machine learning logic 214, the sound classifier 216, the analysis logic 218, the device attribute logic 220, the training logic 224, the inference logic 226, the ML-based SSL pipeline 404, the SSL logic 408, the input feature logic 412, the machine learning logic 414, the pre-processing logic 440, the VoIP logic 442, the voice activity detector 444, and/or flowchart 300 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Example Mobile Device

Figure 5:
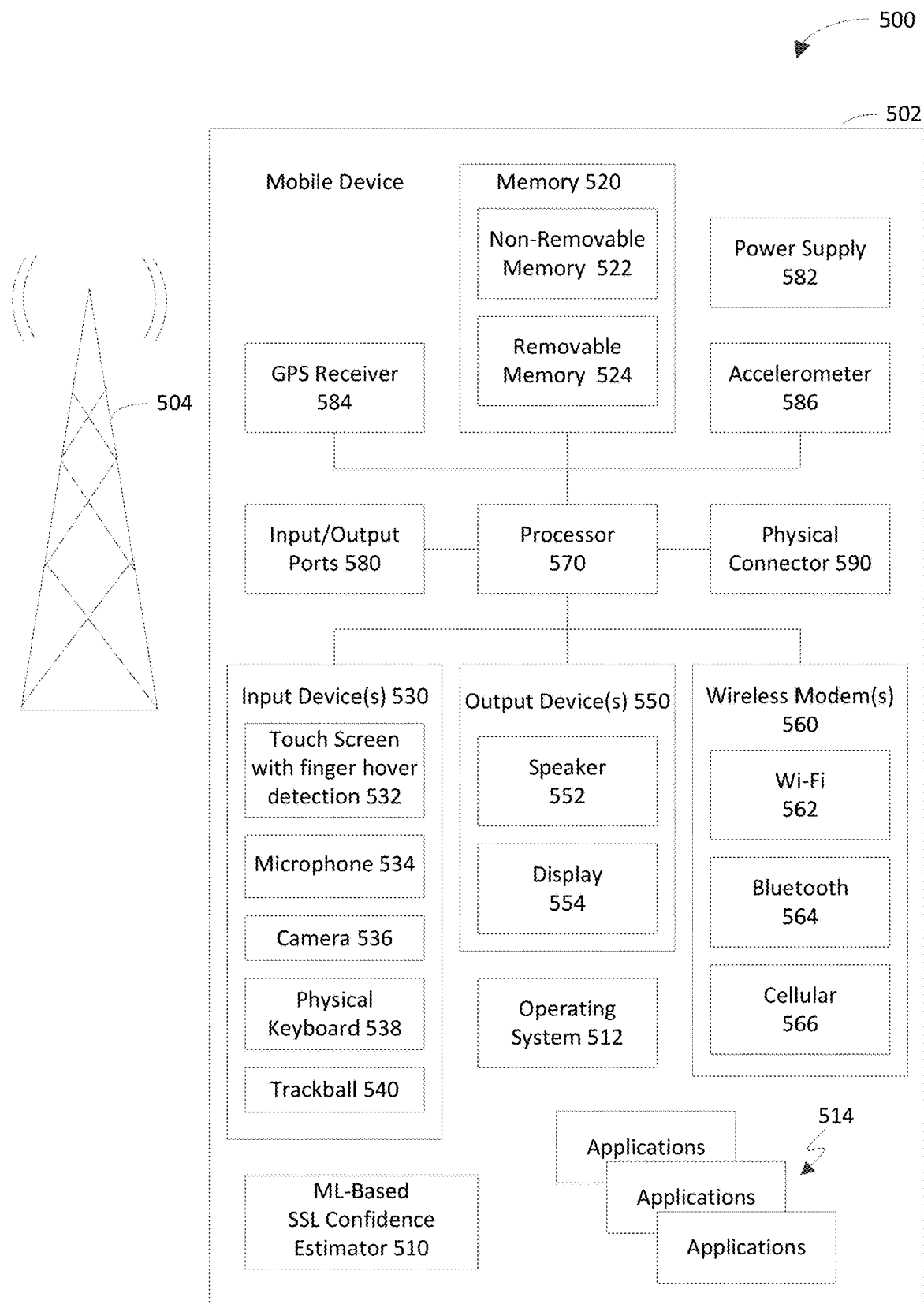
FIG. 5 is a system diagram of an example mobile device in accordance with an embodiment.

FIG. 5 is a system diagram of an exemplary mobile device 500 including a variety of optional hardware and software components, shown generally as 502. Any components 502 in the mobile device may communicate with any other component, though not all connections are shown, for ease of illustration. The mobile device 500 may be any of a variety of computing devices (e.g., cell phone, smartphone, handheld computer, Personal Digital Assistant (PDA), etc.) and may allow wireless two-way communications with one or more mobile communications networks 504, such as a cellular or satellite network, or with a local area or wide area network.

The mobile device 500 may include a processor 570 (e.g., signal processor, microprocessor, ASIC, or other control and processing logic circuitry) for performing such tasks as signal coding, data processing, input/output processing, power control, and/or other functions. An operating system 512 may control the allocation and usage of the components 502 and support for one or more applications 514 (a.k.a. application programs). The applications 514 may include common mobile computing applications (e.g., email applications, calendars, contact managers, web browsers, messaging applications) and any other computing applications (e.g., word processing applications, mapping applications, media player applications).

The mobile device 500 may include memory 520. Memory 520 may include non-removable memory 522 and/or removable memory 524. The non-removable memory 522 may include RAM, ROM, flash memory, a hard disk, or other well-known memory storage technologies. The removable memory 524 may include flash memory or a Subscriber Identity Module (SIM) card, which is well known in GSM communication systems, or other well-known memory storage technologies, such as "smart cards." Memory 520 may store data and/or code for running the operating system 512 and the applications 514. Example data may include web pages, text, images, sound files, video data, or other data sets to be sent to and/or received from one or more network servers or other devices via one or more wired or wireless networks. Memory 520 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 500 may support one or more input devices 530, such as a touch screen 532, microphone 534, camera 536, physical keyboard 538 and/or trackball 540 and one or more output devices 550, such as a speaker 552 and a display 554. Touch screens, such as touch screen 532, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 532 may support a finger hover detection using capacitive sensing, as is well understood in the art. Other detection techniques may be used, including camera-based detection and ultrasonic-based detection. To implement a finger hover, a user's finger is typically within a predetermined spaced distance above the touch screen, such as between one-half of an inch and one inch or between one inch and two inches.

The mobile device 500 may include an ML-based SSL confidence estimator 510. The ML-based SSL confidence estimator 510 is configured to perform SSL confidence estimation using machine learning in accordance with any one or more of the techniques described herein.

Other possible output devices (not shown) may include piezoelectric or other haptic output devices. Some devices may serve more than one input/output function. For example, touch screen 532 and display 554 may be combined in a single input/output device. The input devices 530 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 512 or applications 514 may include speech-recognition software as part of a voice control interface that allows a user to operate the device 500 via voice commands. Furthermore, the device 500 may include input devices and software that allows for user interaction via a user's spatial gestures, such as detecting and interpreting gestures to provide input to a gaming application.

Wireless modem(s) 560 may be coupled to antenna(s) (not shown) and may support two-way communications between the processor 570 and external devices, as is well understood in the art. The modem(s) 560 are shown generically and may include a cellular modem 566 for communicating with the mobile communication network 504 and/or other radio-based modems (e.g., Bluetooth 564 and/or Wi-Fi 562). At least one of the wireless modem(s) 560 is typically configured for communication with one or more cellular networks, such as a GSM network for data and voice communications within a single cellular network, between cellular networks, or between the mobile device and a public switched telephone network (PSTN).

The mobile device may further include at least one input/output port 580, a power supply 582, a satellite navigation system receiver 584, such as a Global Positioning System (GPS) receiver, an accelerometer 586, and/or a physical connector 590, which may be a USB port, IEEE 1394 (FireWire) port, and/or RS-232 port. The illustrated components 502 are not required or all-inclusive, as any components may be deleted and other components may be added as would be recognized by one skilled in the art.

IV. Example Computer System

Figure 6:
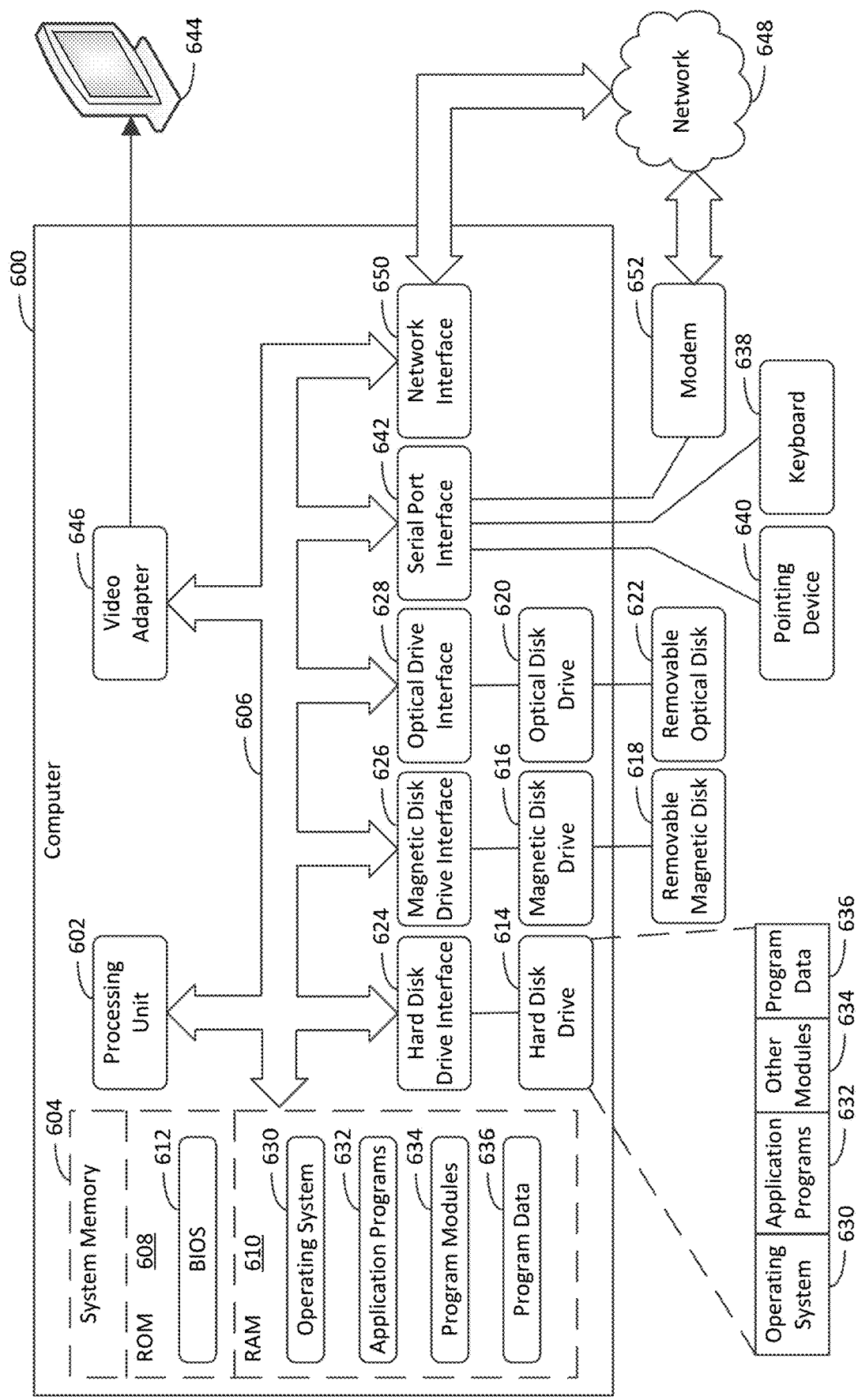
FIG. 6 depicts an example computer in which embodiments may be implemented.

FIG. 6 depicts an example computer 600 in which embodiments may be implemented. Any one or more of the client devices 102A-102M, any one or more of the machines 106A-106N, and/or the ML-based SSL confidence estimator 110 shown in FIG. 1; the computing system 200 shown in FIG. 2; and/or the computing system 400 shown in FIG. 4 may be implemented using the computer 600, including one or more features of the computer 600 and/or alternative features. The computer 600 may be a general-purpose computing device in the form of a conventional personal computer, a mobile computer, or a workstation, for example, or the computer 600 may be a special purpose computing device. The description of the computer 600 provided herein is provided for purposes of illustration, and is not intended to be limiting. Embodiments may be implemented in further types of computer systems, as would be known to persons skilled in the relevant art(s).

As shown in FIG. 6, the computer 600 includes a processing unit 602, a system memory 604, and a bus 606 that couples various system components including the system memory 604 to the processing unit 602. The bus 606 represents one or more of any of several types of bus structures, including a memory bus or memory controller, a peripheral bus, an accelerated graphics port, and a processor or local bus using any of a variety of bus architectures. The system memory 604 includes read only memory (ROM) 608 and random access memory (RAM) 610. A basic input/output system 612 (BIOS) is stored in the ROM 608.

The computer 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. The hard disk drive 614, the magnetic disk drive 616, and the optical disk drive 620 are connected to the bus 606 by a hard disk drive interface 624, a magnetic disk drive interface 626, and an optical drive interface 628, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 630, one or more application programs 632, other program modules 634, and program data 636. The application programs 632 or program modules 634 may include, for example, computer program logic for implementing any one or more of the ML-based SSL confidence estimator 110, the ML-based SSL pipeline 204, the SSL logic 208, the input feature logic 212, the machine learning logic 214, the sound classifier 216, the analysis logic 218, the device attribute logic 220, the training logic 224, the inference logic 226, the ML-based SSL pipeline 404, the SSL logic 408, the input feature logic 412, the machine learning logic 414, the pre-processing logic 440, the VoIP logic 442, the voice activity detector 444, and/or flowchart 300 (including any step of flowchart 300), as described herein.

A user may enter commands and information into the computer 600 through input devices such as a keyboard 638 and a pointing device 640. Other input devices (not shown) may include a microphone, joystick, game pad, satellite dish, scanner, touch screen, camera, accelerometer, gyroscope, or the like. These and other input devices are often connected to the processing unit 602 through a serial port interface 642 that is coupled to the bus 606, but may be connected by other interfaces, such as a parallel port, game port, or a universal serial bus (USB).

A display device 644 (e.g., a monitor) is also connected to the bus 606 via an interface, such as a video adapter 646. In addition to the display device 644, the computer 600 may include other peripheral output devices (not shown) such as speakers and printers.

The computer 600 is connected to a network 648 (e.g., the Internet) through a network interface or adapter 650, a modem 652, or other means for establishing communications over the network. The modem 652, which may be internal or external, is connected to the bus 606 via the serial port interface 642.

As used herein, the terms "computer program medium" and "computer-readable storage medium" are used to generally refer to media (e.g., non-transitory media) such as the hard disk associated with the hard disk drive 614, the removable magnetic disk 618, the removable optical disk 622, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including the application programs 632 and the other program modules 634) may be stored on the hard disk, magnetic disk, optical disk, ROM, or RAM. Such computer programs may also be received via the network interface 650 or the serial port interface 642. Such computer programs, when executed or loaded by an application, enable the computer 600 to implement features of embodiments discussed herein. Accordingly, such computer programs represent controllers of the computer 600.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Further Discussion of Some Example Embodiments

In an example method of using machine learning to perform sound source localization confidence estimation using at least one of (a) one or more processors, (b) hardware logic, or (c) electrical circuitry, a sound source localization (SSL) operation is performed with regard to a sound to determine an SSL direction estimate, which indicates an estimated direction from which the sound is received, and an SSL-based confidence associated with the SSL direction estimate based at least in part on a multi-channel representation of the sound. The SSL-based confidence indicates an estimated probability that the sound is received from the estimated direction. The multi-channel representation includes a plurality of representations of the sound that are detected by a plurality of respective sensors. One or more additional characteristics of the sound are automatically determined. A machine learning (ML) operation is performed based at least in part on the SSL direction estimate, the SSL-based confidence, and the one or more additional characteristics to determine an ML-based confidence associated with the SSL direction estimate.

In a first aspect of the example method, automatically determining the one or more additional characteristics comprises automatically determining a probability that the sound is of a designated type. In accordance with the first aspect, performing the machine learning operation comprises performing the machine learning operation based at least in part on the SSL direction estimate, the SSL-based confidence, and the probability to determine the ML-based confidence associated with the SSL direction estimate.

In an example of the first aspect, automatically determining the one or more additional characteristics comprises classifying the sound to be the designated type selected from a plurality of types based at least in part on the probability. In accordance with this example of the first aspect, performing the machine learning operation comprises determining the ML-based confidence to be more accurate than the SSL-based confidence based at least in part on the sound being classified to be the designated type.

In an implementation of the example of the first aspect, automatically determining the one or more additional characteristics comprises performing a frequency analysis operation with respect to the sound to determine a frequency response of the sound. In accordance with this implementation, automatically determining the one or more additional characteristics further comprises determining that the frequency response corresponds to the designated type. In further accordance with this implementation, determining the ML-based confidence comprises determining the ML-based confidence to be more accurate than the SSL-based confidence further based at least in part on the frequency response corresponding to the designated type.

In a second aspect of the example method, automatically determining the one or more additional characteristics comprises performing an analysis of an environment in which the sound is produced. In accordance with the second aspect, automatically determining the one or more additional characteristics further comprises determining a characteristic of the environment in which the sound is produced based at least in part on the analysis. In further accordance with the second aspect, performing the machine learning operation comprises performing the machine learning operation based at least in part on the SSL direction estimate, the SSL-based confidence, and the characteristic of the environment to determine the ML-based confidence. The second aspect of the example method may be implemented in combination with the first aspect of the example method, though the example embodiments are not limited in this respect.

In a first example of the second aspect, determining the characteristic of the environment comprises determining that a volume of background noise in the environment is greater than or equal to a volume threshold. In accordance with the first example of the second aspect, performing the machine learning operation comprises determining the ML-based confidence to be less than the SSL-based confidence based at least in part on a determination that the volume of the background noise in the environment is greater than or equal to the volume threshold.

In a second example of the second aspect, determining the characteristic of the environment comprises determining that a volume of background noise in the environment is less than or equal to a volume threshold. In accordance with the second example of the second aspect, performing the machine learning operation comprises determining the ML-based confidence to be greater than the SSL-based confidence based at least in part on a determination that the volume of the background noise in the environment is less than or equal to the volume threshold.

In a third example of the second aspect, determining the characteristic of the environment comprises determining that reverberance of the environment is greater than or equal to a reverberance threshold. In accordance with the third example of the second aspect, performing the machine learning operation comprises determining the ML-based confidence to be less than the SSL-based confidence based at least in part on a determination that the reverberance of the environment is greater than or equal to the reverberance threshold.

In a fourth example of the second aspect, determining the characteristic of the environment comprises determining that reverberance of the environment is less than or equal to a reverberance threshold. In accordance with the fourth example of the second aspect, performing the machine learning operation comprises determining the ML-based confidence to be greater than the SSL-based confidence based at least in part on a determination that the reverberance of the environment is less than or equal to the reverberance threshold.

In a third aspect of the example method, the sound includes human voice. In accordance with the third aspect, automatically determining the one or more additional characteristics comprises determining that an attribute of the human voice causes detectability of the human voice to be compromised. In further accordance with the third aspect, performing the machine learning operation comprises determining the ML-based confidence to be less than the SSL-based confidence based at least in part on a determination that the attribute of the human voice causes the detectability of the human voice to be compromised. The third aspect of the example method may be implemented in combination with the first and/or second aspect of the example method, though the example embodiments are not limited in this respect.

In a fourth aspect of the example method, automatically determining the one or more additional characteristics comprises determining that a first sample of the sound, which is captured during a first time period, corresponds to the estimated direction. In accordance with the fourth aspect, automatically determining the one or more additional characteristics further comprises determining that a second sample of the sound, which is captured during a second time period that follows the first time period, corresponds to a second direction that is different from the estimated direction to which the first sample of the sound corresponds. In further accordance with the fourth aspect, performing the machine learning operation comprises determining the ML-based confidence to be more accurate than the SSL-based confidence based at least in part on the first sample of the sound corresponding to the estimated direction and further based at least in part on the first sample being captured before the second sample. The fourth aspect of the example method may be implemented in combination with the first, second, and/or third aspect of the example method, though the example embodiments are not limited in this respect.

In a fifth aspect of the example method, performing the sound source localization operation comprises determining a first weight to be applied to the SSL-based confidence. In accordance with the fifth aspect, automatically determining the one or more additional characteristics comprises determining that the sound is received from a speaker of a device that performs the sound source localization operation. In further accordance with the fifth aspect, performing the machine learning operation comprises determining a second weight, which is to be applied to the ML-based confidence, to be less than the first weight based at least in part on a determination that the sound is received from the speaker of the device. The fifth aspect of the example method may be implemented in combination with the first, second, third, and/or fourth aspect of the example method, though the example embodiments are not limited in this respect.

In a sixth aspect of the example method, performing the machine learning operation comprises performing the machine learning operation based at least in part on the SSL direction estimate, the SSL-based confidence, and the one or more additional characteristics to generate a feature set of a machine learning model that is usable in a subsequent machine learning operation to determine an ML-based confidence inference based at least in part on a second SSL direction estimate that indicates a second estimated direction from which a second sound is received, a second SSL-based confidence that indicates an estimated probability that the second sound is received from the second estimated direction, and one or more additional characteristics of the second sound. The sixth aspect of the example method may be implemented in combination with the first, second, third, fourth, and/or fifth aspect of the example method, though the example embodiments are not limited in this respect.

In a seventh aspect of the example method, performing the machine learning operation comprises performing the machine learning operation utilizing a feature set of a machine learning model based at least in part on the SSL direction estimate, the SSL-based confidence, and the one or more additional characteristics to determine an ML-based confidence inference associated with the SSL direction estimate. The seventh aspect of the example method may be implemented in combination with the first, second, third, fourth, fifth, and/or sixth aspect of the example method, though the example embodiments are not limited in this respect.

In an eighth aspect of the example method, performing the machine learning operation comprises performing the machine learning operation based at least in part on the SSL direction estimate, the SSL-based confidence, and the one or more additional characteristics further to determine an updated estimate, indicating a different estimated direction from which the sound is received. The eighth aspect of the example method may be implemented in combination with the first, second, third, fourth, fifth, sixth, and/or seventh aspect of the example method, though the example embodiments are not limited in this respect.

In a ninth aspect of the example method, the machine learning operation is capable of incorporating arbitrary features associated with respective characteristics of the sound into a determination of the ML-based confidence on-the-fly (e.g., unsupervised learning) without a manual modification of code associated with the machine learning operation to accommodate the arbitrary features. The ninth aspect of the example method may be implemented in combination with the first, second, third, fourth, fifth, sixth, seventh, and/or eighth aspect of the example method, though the example embodiments are not limited in this respect.

In a tenth aspect of the example method, the example method further comprises determining an angle in which to point a video camera in accordance with a dynamic video zoom operation based at least in part on the ML-based confidence. The tenth aspect of the example method may be implemented in combination with the first, second, third, fourth, fifth, sixth, seventh, eighth, and/or ninth aspect of the example method, though the example embodiments are not limited in this respect.

In an eleventh aspect of the example method, the example method further comprises changing directionality of a beamformer steering operation associated with the plurality of sensors to correspond to the estimated direction from which the sound is received, as indicated by the SSL direction estimate, based at least in part on the ML-based confidence. The eleventh aspect of the example method may be implemented in combination with the first, second, third, fourth, fifth, sixth, seventh, eighth, ninth, and/or tenth aspect of the example method, though the example embodiments are not limited in this respect.

An example system to use machine learning to perform sound source localization confidence estimation comprises memory. One or more processors coupled to the memory and configured to perform a sound source localization (SSL) operation with regard to a sound to determine an SSL direction estimate, which indicates an estimated direction from which the sound is received, and an SSL-based confidence associated with the SSL direction estimate based at least in part on a multi-channel representation of the sound. The SSL-based confidence indicates an estimated probability that the sound is received from the estimated direction. The multi-channel representation includes a plurality of representations of the sound that are detected by a plurality of respective sensors. The one or more processors are further configured to automatically determine one or more additional characteristics of the sound. The one or more processors are further configured to perform a machine learning (ML) operation based at least in part on the SSL direction estimate, the SSL-based confidence, and the one or more additional characteristics to determine an ML-based confidence associated with the SSL direction estimate.

In a first aspect of the example system, the one or more processors are configured to automatically determine a probability that the sound is of a designated type. In accordance with the first aspect, the one or more processors are configured to perform the machine learning operation based at least in part on the SSL direction estimate, the SSL-based confidence, and the probability to determine the ML-based confidence associated with the SSL direction estimate.

In an example of the first aspect, the one or more processors are configured to classify the sound to be the designated type selected from a plurality of types based at least in part on the probability. In accordance with the example of the first aspect, the one or more processors are configured to determine the ML-based confidence to be more accurate than the SSL-based confidence based at least in part on the sound being classified to be the designated type.

In an implementation of the example of the first aspect, the one or more processors are configured to perform a frequency analysis operation with respect to the sound to determine a frequency response of the sound. In accordance with this implementation, the one or more processors are configured to determine whether the frequency response corresponds to the designated type. In further accordance with this implementation, the one or more processors are configured to determine the ML-based confidence to be more accurate than the SSL-based confidence further based at least in part on a determination that the frequency response corresponds to the designated type.

In a second aspect of the example system, the one or more processors are configured to perform an analysis of an environment in which the sound is produced. In accordance with the second aspect, the one or more processors are configured to determine a characteristic of the environment in which the sound is produced based at least in part on the analysis. In further accordance with the second aspect, the one or more processors are configured to perform the machine learning operation based at least in part on the SSL direction estimate, the SSL-based confidence, and the characteristic of the environment to determine the ML-based confidence. The second aspect of the example system may be implemented in combination with the first aspect of the example system, though the example embodiments are not limited in this respect.

In a first example of the second aspect, the one or more processors are configured to determine whether a volume of background noise in the environment is greater than or equal to a volume threshold. In accordance with the first example of the second aspect, the one or more processors are configured to determine the ML-based confidence to be less than the SSL-based confidence based at least in part on a determination that the volume of the background noise in the environment is greater than or equal to the volume threshold.

In a second example of the second aspect, the one or more processors are configured to determine whether a volume of background noise in the environment is less than or equal to a volume threshold. In accordance with the second example of the second aspect, the one or more processors are configured to determine the ML-based confidence to be greater than the SSL-based confidence based at least in part on a determination that the volume of the background noise in the environment is less than or equal to the volume threshold.

In a third example of the second aspect, the one or more processors are configured to determine whether reverberance of the environment is greater than or equal to a reverberance threshold. In accordance with the third example of the second aspect, the one or more processors are configured to determine the ML-based confidence to be less than the SSL-based confidence based at least in part on a determination that the reverberance of the environment is greater than or equal to the reverberance threshold.

In a fourth example of the second aspect, the one or more processors are configured to determine whether reverberance of the environment is less than or equal to a reverberance threshold. In accordance with the fourth example of the second aspect, the one or more processors are configured to determine the ML-based confidence to be greater than the SSL-based confidence based at least in part on a determination that the reverberance of the environment is less than or equal to the reverberance threshold.

In a third aspect of the example system, the sound includes human voice. In accordance with the third aspect, the one or more processors are configured to determine whether an attribute of the human voice causes detectability of the human voice to be compromised. In further accordance with the third aspect, the one or more processors are configured to determine the ML-based confidence to be less than the SSL-based confidence based at least in part on a determination that the attribute of the human voice causes the detectability of the human voice to be compromised. The third aspect of the example system may be implemented in combination with the first and/or second aspect of the example system, though the example embodiments are not limited in this respect.

In a fourth aspect of the example system, the one or more processors are configured to determine that a first sample of the sound, which is captured during a first time period, corresponds to the estimated direction. In accordance with the fourth aspect, the one or more processors are configured to determine that a second sample of the sound, which is captured during a second time period that follows the first time period, corresponds to a second direction that is different from the estimated direction to which the first sample of the sound corresponds. In accordance with the fourth aspect, the one or more processors are configured to determine the ML-based confidence to be more accurate than the SSL-based confidence based at least in part on the first sample of the sound corresponding to the estimated direction and further based at least in part on the first sample being captured before the second sample. The fourth aspect of the example system may be implemented in combination with the first, second, and/or third aspect of the example system, though the example embodiments are not limited in this respect.

In fifth aspect of the example system, the one or more processors are configured to determine a first weight to be applied to the SSL-based confidence during the sound source localization operation. In accordance with the fifth aspect, the one or more processors are configured to determine that the sound is received from a speaker of a device that performs the sound source localization operation. In further accordance with the fifth aspect, the one or more processors are configured to determine a second weight, which is to be applied to the ML-based confidence, to be less than the first weight based at least in part on a determination that the sound is received from the speaker of the device. The fifth aspect of the example system may be implemented in combination with the first, second, third, and/or fourth aspect of the example system, though the example embodiments are not limited in this respect.

In a sixth aspect of the example system, the one or more processors are configured to perform the machine learning operation based at least in part on the SSL direction estimate, the SSL-based confidence, and the one or more additional characteristics to generate a feature set of a machine learning model that is usable in a subsequent machine learning operation to determine a second ML-based confidence based at least in part on a second SSL direction estimate that indicates a second estimated direction from which a second sound is received, a second SSL-based confidence that indicates an estimated probability that the second sound is received from the second estimated direction, and one or more additional characteristics of the second sound. The sixth aspect of the example system may be implemented in combination with the first, second, third, fourth, and/or fifth aspect of the example system, though the example embodiments are not limited in this respect.

In a seventh aspect of the example system, the one or more processors are configured to perform the machine learning operation utilizing a feature set of a machine learning model based at least in part on the SSL direction estimate, the SSL-based confidence, and the one or more additional characteristics to determine the ML-based confidence associated with the SSL direction estimate. The seventh aspect of the example system may be implemented in combination with the first, second, third, fourth, fifth, and/or sixth aspect of the example system, though the example embodiments are not limited in this respect.

In an eighth aspect of the example system, the one or more processors are configured to perform the machine learning operation based at least in part on the SSL direction estimate, the SSL-based confidence, and the one or more additional characteristics further to determine an updated estimate, indicating a different estimated direction from which the sound is received. The eighth aspect of the example system may be implemented in combination with the first, second, third, fourth, fifth, sixth, and/or seventh aspect of the example system, though the example embodiments are not limited in this respect.

In a ninth aspect of the example system, the machine learning operation is capable of incorporating arbitrary features associated with respective characteristics of the sound into a determination of the ML-based confidence on-the-fly (e.g., unsupervised learning) without a manual modification of code associated with the machine learning operation to accommodate the arbitrary features. The ninth aspect of the example system may be implemented in combination with the first, second, third, fourth, fifth, sixth, seventh, and/or eighth aspect of the example system, though the example embodiments are not limited in this respect.

In a tenth aspect of the example system, the one or more processors are configured to determine an angle in which to point a video camera in accordance with a dynamic video zoom operation based at least in part on the ML-based confidence. The tenth aspect of the example system may be implemented in combination with the first, second, third, fourth, fifth, sixth, seventh, eighth, and/or ninth aspect of the example system, though the example embodiments are not limited in this respect.

In an eleventh aspect of the example system, the one or more processors are configured to change directionality of a beamformer steering operation associated with the plurality of sensors to correspond to the estimated direction from which the sound is received, as indicated by the SSL direction estimate, based at least in part on the ML-based confidence. The eleventh aspect of the example system may be implemented in combination with the first, second, third, fourth, fifth, sixth, seventh, eighth, ninth, and/or tenth aspect of the example system, though the example embodiments are not limited in this respect.

An example computer program product comprises a computer-readable storage medium having instructions recorded thereon for enabling a processor-based system to use machine learning to perform sound source localization confidence estimation. The instructions comprise first instructions, second instructions, and third instructions. The first instructions are for enabling the processor-based system to perform a sound source localization (SSL) operation with regard to a sound to determine an SSL direction estimate, which indicates an estimated direction from which the sound is received, and an SSL-based confidence associated with the SSL direction estimate based at least in part on a multi-channel representation of the sound. The SSL-based confidence indicates an estimated probability that the sound is received from the estimated direction. The multi-channel representation includes a plurality of representations of the sound that are detected by a plurality of respective sensors. The second instructions are for enabling the processor-based system to automatically determine one or more additional characteristics of the sound. The third instructions are for enabling the processor-based system to perform a machine learning (ML) operation based at least in part on the SSL direction estimate, the SSL-based confidence, and the one or more additional characteristics to determine an ML-based confidence associated with the SSL direction estimate.

In a first aspect of the example computer program product, the second instructions comprise instructions for enabling the processor-based system to automatically determine a probability that the sound is of a designated type. In accordance with the first aspect, the third instructions comprise instructions for enabling the processor-based system to perform the machine learning operation based at least in part on the SSL direction estimate, the SSL-based confidence, and the probability to determine the ML-based confidence associated with the SSL direction estimate.

In an example of the first aspect, the second instructions comprise instructions for enabling the processor-based system to classify the sound to be the designated type selected from a plurality of types based at least in part on the probability. In accordance with the example of the first aspect, the third instructions comprise instructions for enabling the processor-based system to determine the ML-based confidence to be more accurate than the SSL-based confidence based at least in part on the sound being classified to be the designated type.

In an implementation of the example of the first aspect, the second instructions comprise instructions for enabling the processor-based system to perform a frequency analysis operation with respect to the sound to determine a frequency response of the sound. In accordance with this implementation, the second instructions further comprise instructions for enabling the processor-based system to determine whether the frequency response corresponds to the designated type. In further accordance with this implementation, the instructions for enabling the processor-based system to determine the ML-based confidence comprise instructions for enabling the processor-based system to determine the ML-based confidence to be more accurate than the SSL-based confidence further based at least in part on a determination that the frequency response corresponds to the designated type.

In a second aspect of the example computer program product, the second instructions comprise instructions for enabling the processor-based system to perform an analysis of an environment in which the sound is produced. In accordance with the second aspect, the second instructions further comprise instructions for enabling the processor-based system to determine a characteristic of the environment in which the sound is produced based at least in part on the analysis. In further accordance with the second aspect, the third instructions comprise instructions for enabling the processor-based system to perform the machine learning operation based at least in part on the SSL direction estimate, the SSL-based confidence, and the characteristic of the environment to determine the ML-based confidence. The second aspect of the example computer program product may be implemented in combination with the first aspect of the example computer program product, though the example embodiments are not limited in this respect.

In a first example of the second aspect, the instructions for enabling the processor-based system to determine the characteristic of the environment comprise instructions for enabling the processor-based system to determine whether a volume of background noise in the environment is greater than or equal to a volume threshold. In accordance with the first example of the second aspect, the third instructions comprise instructions for enabling the processor-based system to determine the ML-based confidence to be less than the SSL-based confidence based at least in part on a determination that the volume of the background noise in the environment is greater than or equal to the volume threshold.

In a second example of the second aspect, the instructions for enabling the processor-based system to determine the characteristic of the environment comprise instructions for enabling the processor-based system to determine whether a volume of background noise in the environment is less than or equal to a volume threshold. In accordance with the second example of the second aspect, the third instructions comprise instructions for enabling the processor-based system to determine the ML-based confidence to be greater than the SSL-based confidence based at least in part on a determination that the volume of the background noise in the environment is less than or equal to the volume threshold.

In a third example of the second aspect, the instructions for enabling the processor-based system to determine the characteristic of the environment comprise instructions for enabling the processor-based system to determine whether reverberance of the environment is greater than or equal to a reverberance threshold. In accordance with the third example of the second aspect, the third instructions comprise instructions for enabling the processor-based system to determine the ML-based confidence to be less than the SSL-based confidence based at least in part on a determination that the reverberance of the environment is greater than or equal to the reverberance threshold.

In a fourth example of the second aspect, the instructions for enabling the processor-based system to determine the characteristic of the environment comprise instructions for enabling the processor-based system to determine whether reverberance of the environment is less than or equal to a reverberance threshold. In accordance with the fourth example of the second aspect, the third instructions comprise instructions for enabling the processor-based system to determine the ML-based confidence to be greater than the SSL-based confidence based at least in part on a determination that the reverberance of the environment is less than or equal to the reverberance threshold.

In a third aspect of the example computer program product, the sound includes human voice. In accordance with the third aspect, the second instructions comprise instructions for enabling the processor-based system to determine whether an attribute of the human voice causes detectability of the human voice to be compromised. In accordance with the third aspect, the third instructions comprise instructions for enabling the processor-based system to determine the ML-based confidence to be less than the SSL-based confidence based at least in part on a determination that the attribute of the human voice causes the detectability of the human voice to be compromised. The third aspect of the example computer program product may be implemented in combination with the first and/or second aspect of the example computer program product, though the example embodiments are not limited in this respect.

In a fourth aspect of the example computer program product, the second instructions comprise instructions for enabling the processor-based system to determine that a first sample of the sound, which is captured during a first time period, corresponds to the estimated direction. In accordance with the fourth aspect, the second instructions further comprise instructions for enabling the processor-based system to determine that a second sample of the sound, which is captured during a second time period that follows the first time period, corresponds to a second direction that is different from the estimated direction to which the first sample of the sound corresponds. In further accordance with the fourth aspect, the third instructions comprise instructions for enabling the processor-based system to determine the ML-based confidence to be more accurate than the SSL-based confidence based at least in part on the first sample of the sound corresponding to the estimated direction and further based at least in part on the first sample being captured before the second sample. The fourth aspect of the example computer program product may be implemented in combination with the first, second, and/or third aspect of the example computer program product, though the example embodiments are not limited in this respect.

In fifth aspect of the example computer program product, the first instructions comprise instructions for enabling the processor-based system to determine a first weight to be applied to the SSL-based confidence. In accordance with the fifth aspect, the second instructions comprise instructions for enabling the processor-based system to determine that the sound is received from a speaker of a device that performs the sound source localization operation. In further accordance with the fifth aspect, the third instructions comprise instructions for enabling the processor-based system to determine a second weight, which is to be applied to the ML-based confidence, to be less than the first weight based at least in part on a determination that the sound is received from the speaker of the device. The fifth aspect of the example computer program product may be implemented in combination with the first, second, third, and/or fourth aspect of the example computer program product, though the example embodiments are not limited in this respect.

In a sixth aspect of the example computer program product, the third instructions comprise instructions for enabling the processor-based system to perform the machine learning operation based at least in part on the SSL direction estimate, the SSL-based confidence, and the one or more additional characteristics to generate a feature set of a machine learning model that is usable in a subsequent machine learning operation to determine a second ML-based confidence based at least in part on a second SSL direction estimate that indicates a second estimated direction from which a second sound is received, a second SSL-based confidence that indicates an estimated probability that the second sound is received from the second estimated direction, and one or more additional characteristics of the second sound. The sixth aspect of the example computer program product may be implemented in combination with the first, second, third, fourth, and/or fifth aspect of the example computer program product, though the example embodiments are not limited in this respect.

In a seventh aspect of the example computer program product, the third instructions comprise instructions for enabling the processor-based system to perform the machine learning operation utilizing a feature set of a machine learning model based at least in part on the SSL direction estimate, the SSL-based confidence, and the one or more additional characteristics to determine the ML-based confidence associated with the SSL direction estimate. The seventh aspect of the example computer program product may be implemented in combination with the first, second, third, fourth, fifth, and/or sixth aspect of the example computer program product, though the example embodiments are not limited in this respect.

In an eighth aspect of the example computer program product, the third instructions comprise instructions for enabling the processor-based system to perform the machine learning operation based at least in part on the SSL direction estimate, the SSL-based confidence, and the one or more additional characteristics further to determine an updated estimate, indicating a different estimated direction from which the sound is received. The eighth aspect of the example computer program product may be implemented in combination with the first, second, third, fourth, fifth, sixth, and/or seventh aspect of the example computer program product, though the example embodiments are not limited in this respect.

In a ninth aspect of the example computer program product, the machine learning operation is capable of incorporating arbitrary features associated with respective characteristics of the sound into a determination of the ML-based confidence on-the-fly (e.g., unsupervised learning) without a manual modification of code associated with the machine learning operation to accommodate the arbitrary features. The ninth aspect of the example computer program product may be implemented in combination with the first, second, third, fourth, fifth, sixth, seventh, and/or eighth aspect of the example computer program product, though the example embodiments are not limited in this respect.

In a tenth aspect of the example computer program product, the instructions further comprise fourth instructions for enabling the processor-based system to determine an angle in which to point a video camera in accordance with a dynamic video zoom operation based at least in part on the ML-based confidence. The tenth aspect of the example computer program product may be implemented in combination with the first, second, third, fourth, fifth, sixth, seventh, eighth, and/or ninth aspect of the example computer program product, though the example embodiments are not limited in this respect.

In an eleventh aspect of the example computer program product, the instructions further comprise fourth instructions for enabling the processor-based system to change directionality of a beamformer steering operation associated with the plurality of sensors to correspond to the estimated direction from which the sound is received, as indicated by the SSL direction estimate, based at least in part on the ML-based confidence. The eleventh aspect of the example computer program product may be implemented in combination with the first, second, third, fourth, fifth, sixth, seventh, eighth, ninth, and/or tenth aspect of the example computer program product, though the example embodiments are not limited in this respect.

VI. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to use machine learning to perform sound source localization confidence estimation, the system comprising:
  memory; and
  one or more processors coupled to the memory and configured to:
    perform a sound source localization (SSL) operation with regard to a sound to determine an SSL direction estimate, which indicates an estimated direction from which the sound is received, and an SSL-based confidence associated with the SSL direction estimate based at least in part on a multi-channel representation of the sound,
      the SSL-based confidence indicating an estimated probability that the sound is received from the estimated direction,
      the multi-channel representation including a plurality of representations of the sound that are detected by a plurality of respective sensors;
    automatically determine one or more additional characteristics of the sound; and
    perform a machine learning (ML) operation based at least in part on the SSL direction estimate, the SSL-based confidence, and the one or more additional characteristics to determine an ML-based confidence associated with the SSL direction estimate, wherein the machine learning operation is capable of incorporating arbitrary features associated with respective characteristics of the sound into a determination of the ML-based confidence on-the-fly without a manual modification of code associated with the machine learning operation to accommodate the arbitrary features.

2. The system of claim 1, wherein the one or more processors are configured to automatically determine a probability that the sound is of a designated type; and
  wherein the one or more processors are configured to perform the machine learning operation based at least in part on the SSL direction estimate, the SSL-based confidence, and the probability to determine the ML-based confidence associated with the SSL direction estimate.

3. The system of claim 2, wherein the one or more processors are configured to classify the sound to be the designated type selected from a plurality of types based at least in part on the probability; and wherein the one or more processors are configured to determine the ML-based confidence to be more accurate than the SSL-based confidence based at least in part on the sound being classified to be the designated type.

4. The system of claim 3, wherein the one or more processors are configured to perform a frequency analysis operation with respect to the sound to determine a frequency response of the sound;

wherein the one or more processors are configured to determine whether the frequency response corresponds to the designated type; and wherein the one or more processors are configured to determine the ML-based confidence to be more accurate than the SSL-based confidence further based at least in part on a determination that the frequency response corresponds to the designated type.

5. The system of claim 1, wherein the one or more processors are configured to perform an analysis of an environment in which the sound is produced;

wherein the one or more processors are configured to determine a characteristic of the environment in which the sound is produced based at least in part on the analysis; and wherein the one or more processors are configured to perform the machine learning operation based at least in part on the SSL direction estimate, the SSL-based confidence, and the characteristic of the environment to determine the ML-based confidence.

6. The system of claim 5, wherein the one or more processors are configured to determine whether a volume of background noise in the environment is greater than or equal to a volume threshold; and wherein the one or more processors are configured to determine the ML-based confidence to be less than the SSL-based confidence based at least in part on a determination that the volume of the background noise in the environment is greater than or equal to the volume threshold.

7. The system of claim 5, wherein the one or more processors are configured to determine whether reverberance of the environment is greater than or equal to a reverberance threshold; and wherein the one or more processors are configured to determine the ML-based confidence to be less than the SSL-based confidence based at least in part on a determination that the reverberance of the environment is greater than or equal to the reverberance threshold.

8. The system of claim 1, wherein the one or more processors are configured to determine an angle in which to point a video camera in accordance with a dynamic video zoom operation based at least in part on the ML-based confidence.

9. The system of claim 1, wherein the one or more processors are configured to change directionality of a beamformer steering operation associated with the plurality of sensors to correspond to the estimated direction from which the sound is received, as indicated by the SSL direction estimate, based at least in part on the ML-based confidence.

10. The system of claim 1, wherein the one or more processors are configured to:

perform the machine learning operation based at least in part on the SSL direction estimate, the SSL-based confidence, and the one or more additional characteristics to generate a feature set of a machine learning model that is usable in a subsequent machine learning operation to determine an ML-based confidence inference based at least in part on a second SSL direction estimate that indicates a second estimated direction from which a second sound is received, a second SSL-based confidence that indicates an estimated probability that the second sound is received from the second estimated direction, and one or more additional characteristics of the second sound.

11. A method of using machine learning to perform sound source localization confidence estimation using at least one of (a) one or more processors, (b) hardware logic, or (c) electrical circuitry, the method comprising:

performing a sound source localization (SSL) operation with regard to a sound to determine an SSL direction estimate, which indicates an estimated direction from which the sound is received, and an SSL-based confidence associated with the SSL direction estimate based at least in part on a multi-channel representation of the sound, the SSL-based confidence indicating an estimated probability that the sound is received from the estimated direction, the multi-channel representation including a plurality of representations of the sound that are detected by a plurality of respective sensors;

automatically determining one or more additional characteristics of the sound; and performing a machine learning (ML) operation based at least in part on the SSL direction estimate, the SSL-based confidence, and the one or more additional characteristics to determine an ML-based confidence associated with the SSL direction estimate and to generate a feature set of a machine learning model that is usable in a subsequent machine learning operation to determine an ML-based confidence inference based at least in part on a second SSL direction estimate that indicates a second estimated direction from which a second sound is received, a second SSL-based confidence that indicates an estimated probability that the second sound is received from the second estimated direction, and one or more additional characteristics of the second sound.

12. The method of claim 11, wherein automatically determining the one or more additional characteristics comprises:

performing an analysis of an environment in which the sound is produced; and determining a characteristic of the environment in which the sound is produced based at least in part on the analysis; and wherein performing the machine learning operation comprises:

performing the machine learning operation based at least in part on the SSL direction estimate, the SSL-based confidence, and the characteristic of the environment to determine the ML-based confidence.

13. The method of claim 12, wherein determining the characteristic of the environment comprises:

determining that at least one of a volume of background noise in the environment or reverberance of the environment is less than or equal to a threshold; and wherein performing the machine learning operation comprises:

determining the ML-based confidence to be greater than the SSL-based confidence based at least in part on a determination that the at least one of the volume of the background noise in the environment or the reverberance of the environment is less than or equal to the threshold.

14. The method of claim 11, wherein the sound includes human voice;
wherein automatically determining the one or more additional characteristics comprises:
determining that an attribute of the human voice causes detectability of the human voice to be compromised; and
wherein performing the machine learning operation comprises:
determining the ML-based confidence to be less than the SSL-based confidence based at least in part on a determination that the attribute of the human voice causes the detectability of the human voice to be compromised.

15. The method of claim 11, wherein automatically determining the one or more additional characteristics comprises:
determining that a first sample of the sound, which is captured during a first time period, corresponds to the estimated direction; and
determining that a second sample of the sound, which is captured during a second time period that follows the first time period, corresponds to a second direction that is different from the estimated direction to which the first sample of the sound corresponds; and
wherein performing the machine learning operation comprises:
determining the ML-based confidence to be more accurate than the SSL-based confidence based at least in part on the first sample of the sound corresponding to the estimated direction and further based at least in part on the first sample being captured before the second sample.

16. The method of claim 11, wherein performing the sound source localization operation comprises:
determining a first weight to be applied to the SSL-based confidence;
wherein automatically determining the one or more additional characteristics comprises:
determining that the sound is received from a speaker of a device that performs the sound source localization operation; and
wherein performing the machine learning operation comprises:
determining a second weight, which is to be applied to the ML-based confidence, to be less than the first weight based at least in part on a determination that the sound is received from the speaker of the device.

17. The method of claim 11, wherein performing the machine learning operation comprises:
performing the machine learning operation utilizing a feature set of a machine learning model based at least in part on the SSL direction estimate, the SSL-based confidence, and the one or more additional characteristics to determine an ML-based confidence inference associated with the SSL direction estimate.

18. The method of claim 11, wherein automatically determining the one or more additional characteristics of the sound comprises:
automatically determining a probability that the sound is of a designated type; and
classifying the sound to be the designated type selected from a plurality of types based at least in part on the probability; and
wherein performing the machine learning operation comprises:
performing the machine learning operation based at least in part on the SSL direction estimate, the SSL-based confidence, and the probability to determine the ML-based confidence to be more accurate than the SSL-based confidence based at least in part on the sound being classified to be the designated type.

19. The method of claim 11, wherein performing the machine learning operation comprises:
performing the machine learning operation based at least in part on the SSL direction estimate, the SSL-based confidence, and the one or more additional characteristics further to determine an updated estimate, indicating a different estimated direction from which the sound is received.

20. A system to use machine learning to perform sound source localization confidence estimation, the system comprising:
memory; and
one or more processors coupled to the memory and configured to:
perform a sound source localization (SSL) operation with regard to a sound to determine an SSL direction estimate, which indicates an estimated direction from which the sound is received, and an SSL-based confidence associated with the SSL direction estimate based at least in part on a multi-channel representation of the sound,
the SSL-based confidence indicating an estimated probability that the sound is received from the estimated direction,
the multi-channel representation including a plurality of representations of the sound that are detected by a plurality of respective sensors;
automatically determine one or more additional characteristics of the sound;
perform a machine learning (ML) operation based at least in part on the SSL direction estimate, the SSL-based confidence, and the one or more additional characteristics to determine an ML-based confidence associated with the SSL direction estimate; and
determine an angle in which to point a video camera in accordance with a dynamic video zoom operation based at least in part on the ML-based confidence.

* * * * *